(12) United States Patent
Kume et al.

(10) Patent No.: US 12,469,307 B2
(45) Date of Patent: Nov. 11, 2025

(54) DISPLAY CONTROL DEVICE

(71) Applicant: DENSO CORPORATION, Kariya (JP)

(72) Inventors: Takuya Kume, Kariya (JP); Kazuki Izumi, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 174 days.

(21) Appl. No.: 18/358,900

(22) Filed: Jul. 25, 2023

(65) Prior Publication Data

US 2023/0373309 A1    Nov. 23, 2023

Related U.S. Application Data

(63) Continuation of application No. PCT/JP2022/000644, filed on Jan. 12, 2022.

(30) Foreign Application Priority Data

Feb. 8, 2021 (JP) .................................. 2021-018351
Oct. 28, 2021 (JP) .................................. 2021-176833

(51) Int. Cl.
*G06V 20/56* (2022.01)
*B60K 35/10* (2024.01)
*B60K 35/22* (2024.01)
*B60K 35/26* (2024.01)
*B60K 35/28* (2024.01)
(Continued)

(52) U.S. Cl.
CPC ............ *G06V 20/588* (2022.01); *B60K 35/10* (2024.01); *B60K 35/22* (2024.01); *B60K 35/265* (2024.01); *B60K 35/28* (2024.01);

*B60K 35/81* (2024.01); *B60K 35/29* (2024.01); *B60K 2360/166* (2024.01); *B60K 2360/171* (2024.01);
(Continued)

(58) Field of Classification Search
CPC .. B60K 35/00; B60K 2360/178; B60K 35/28; B60K 2360/171; B60K 2360/166; B60K 2360/176; B60K 35/29; B60K 2360/186; G06V 20/588
See application file for complete search history.

(56) References Cited

U.S. PATENT DOCUMENTS

2018/0046185 A1    2/2018    Sato et al.
2018/0157038 A1    6/2018    Kabe
(Continued)

FOREIGN PATENT DOCUMENTS

JP    2005324661 A    11/2005
JP    2017107502 A    6/2017
(Continued)

*Primary Examiner* — Michael D Lang
(74) *Attorney, Agent, or Firm* — Harness, Dickey & Pierce, P.L.C.

(57) ABSTRACT

A display control device for controlling display of a peripheral image indicating a traveling environment of a host vehicle based on information acquired by a sensor recognizes the traveling environment. The display control device includes an information acquisition unit and a display control unit. The information acquisition unit acquires at least type information indicating a type of a road and shape information indicating a lane shape of the road as road information related to the road around the host vehicle. The display control unit draws line images reproducing the road in the peripheral image based on the shape information. The display control unit changes a number of the line images drawn in the peripheral image based on the type information.

33 Claims, 8 Drawing Sheets

(51) Int. Cl.
  *B60K 35/29* (2024.01)
  *B60K 35/81* (2024.01)
(52) U.S. Cl.
  CPC .. *B60K 2360/176* (2024.01); *B60K 2360/178* (2024.01); *B60K 2360/186* (2024.01)

(56) References Cited

U.S. PATENT DOCUMENTS

| | | |
|---|---|---|
| 2018/0312110 A1 | 11/2018 | Takae et al. |
| 2019/0039618 A1 | 2/2019 | Mori |
| 2019/0281235 A1 | 9/2019 | Breuer et al. |
| 2020/0247319 A1 | 8/2020 | Shimizu et al. |

FOREIGN PATENT DOCUMENTS

| | | |
|---|---|---|
| JP | 2018027726 A | 2/2018 |
| JP | 6466899 B2 | 2/2019 |
| WO | WO-2017068692 A1 | 4/2017 |
| WO | WO-2017154396 A1 | 9/2017 |
| WO | WO-2019038904 A1 | 2/2019 |

DISPLAY CONTROL DEVICE

CROSS REFERENCE TO RELATED APPLICATIONS

The present application is a continuation application of International Patent Application No. PCT/JP2022/000644 filed on Jan. 12, 2022, which designated the U.S. and claims the benefit of priority from Japanese Patent Application No. 2021-018351 filed on Feb. 8, 2021 and Japanese Patent Application No. 2021-176833 filed on Oct. 28, 2021. The entire disclosures of all of the above applications are incorporated herein by reference.

TECHNICAL FIELD

The present disclosure relates to a display control device.

BACKGROUND

A vehicle display device displays a host vehicle icon and line icons on a display of a host vehicle.

SUMMARY

According to at least one embodiment, display control techniques for controlling display of a peripheral image indicating a traveling environment of a host vehicle based on information acquired by a sensor recognizes the traveling environment. The display control techniques acquire at least type information indicating a type of a road and shape information indicating a lane shape of the road as road information related to the road around the host vehicle. The display control techniques draw line images reproducing the road in the peripheral image based on the shape information, change a number of the line images drawn in the peripheral image based on the type information.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
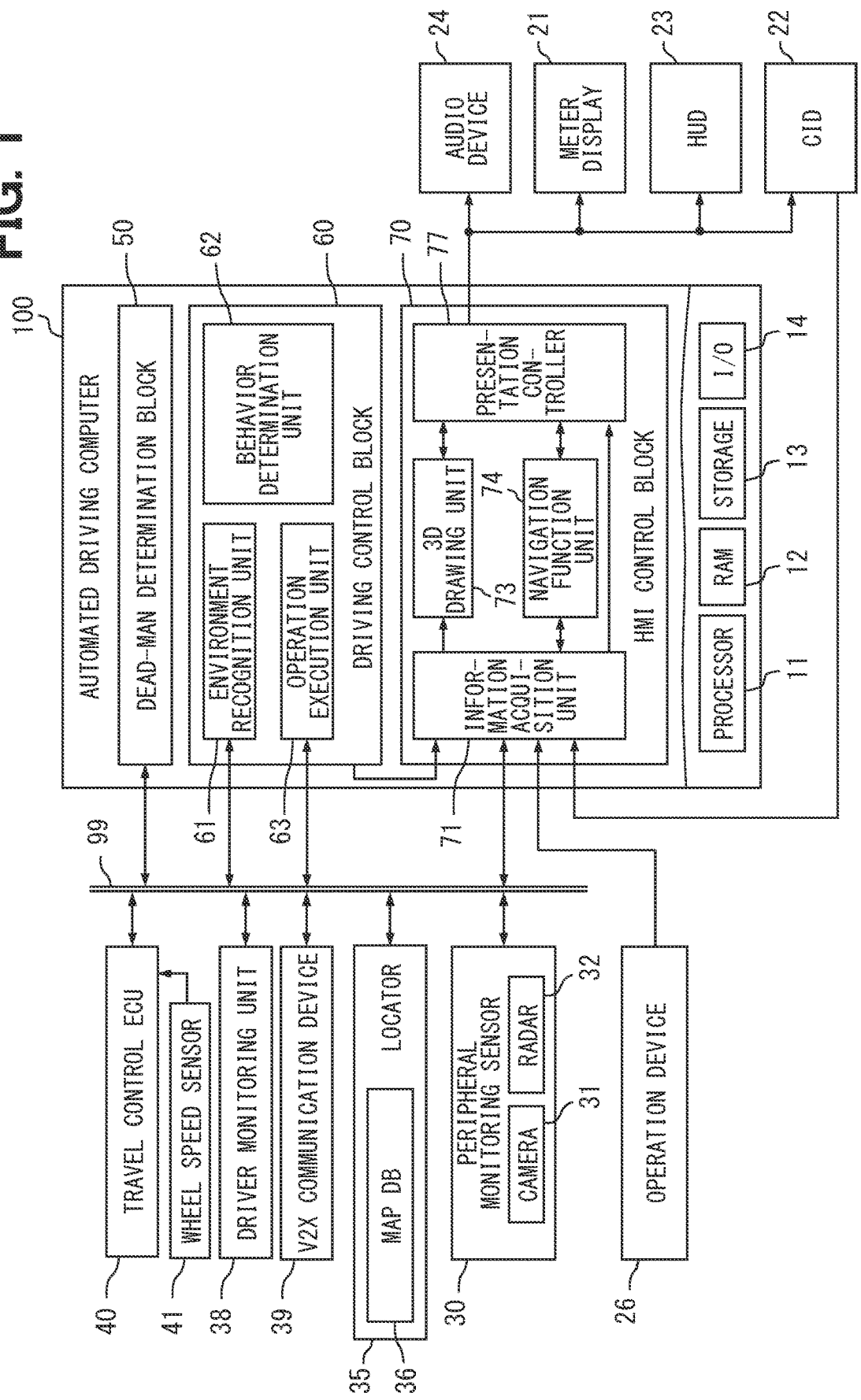
FIG. 1 is a diagram illustrating a whole image of an in-vehicle network including an automated driving computer according to a first embodiment of the present disclosure.

To begin with, examples of relevant techniques will be described.

A vehicle display device in a comparative example displays a host vehicle icon and line icons on a display of a host vehicle. The vehicle display further displays, for example, an arrow icon indicating that a lane change to an adjacent lane is possible, another vehicle icon indicating another vehicle in the adjacent lane, and the like based on a traveling environment around the host vehicle recognized by a camera, a radar, and the like.

In recent years, a range around an own vehicle that can be recognized by a camera or the like has been rapidly expanding. Therefore, as in the vehicle display device disclosed in the comparative example, when all of a lane marking, an obstacle, and the like that can be recognized by the camera or the like are displayed, content may be complicated depending on a traveling scene, and the display may be difficult for a driver to understand.

In contrast to the comparative example, according to a presentation control device and non-transitory computer readable medium, a traveling environment around a host vehicle in an easy-to-understand manner can present.

According to one aspect of the present disclosure, display control techniques for controlling display of a peripheral image indicating a traveling environment of a host vehicle based on information acquired by a sensor recognizes the traveling environment. The display control techniques acquires at least type information indicating a type of a road and shape information indicating a lane shape of the road as road information related to the road around the host vehicle. The display control techniques draw line images reproducing the road in the peripheral image based on the shape information. The display control techniques change a number of the line images drawn in the peripheral image based on the type information.

According to this configuration, since the number of line images drawn in the peripheral image is changed based on the road type information, the content of the peripheral image can be simplified according to the traveling scene. As a result, the peripheral image is capable of presenting the traveling environment around the host vehicle in an easy-to-understand manner.

According to one aspect of the present disclosure, display control techniques for controlling display of a peripheral image indicating a traveling environment of a host vehicle based on information acquired by a sensor recognizes the traveling environment. The display control techniques acquire shape information indicating a lane shape of the road around the host vehicle and automated driving information indicating presence or absence of a surroundings monitoring obligation in the automated driving executed in the host vehicle. The display control techniques draw line images reproducing the road in the peripheral image based on the shape information. The display control techniques change the number of the line images drawn in the peripheral image in accordance with the presence or absence of the surroundings monitoring obligation in the automated driving being executed.

According to one aspect of the present disclosure, the number of line images drawn in the peripheral image is changed according to the presence or absence of the surroundings monitoring obligation in the automated driving being executed. Therefore, even when the information recognized by the sensor for the automated driving increases, the content of the peripheral image can be simplified in accordance with the operation state of the automated driving. As a result, the peripheral image is capable of presenting the traveling environment around the host vehicle in an easy-to-understand manner.

According to one aspect of the present disclosure, display control techniques for controlling display of a peripheral image indicating a traveling environment of a host vehicle based on information acquired by a sensor recognizes the traveling environment. The display control techniques acquire shape information indicating a lane shape of the road around the host vehicle and recognition information of other vehicles traveling around the host vehicle. The display control techniques draw line images reproducing the road in the peripheral image based on the shape information. The display control techniques change a number of the line images drawn in the peripheral image according to a number of the other vehicles traveling around the host vehicle based on the recognition information.

According to one aspect of the present disclosure, the number of line images drawn in the peripheral image is changed according to the number of other vehicles traveling around the host vehicle. Therefore, the peripheral image is changed to a mode in which the other vehicle is easily grasped in accordance with a change in traffic volume around the host vehicle. As a result, the peripheral image is capable of presenting the positional relationship between the host vehicle and another vehicle around the host vehicle in an easy-to-understand manner.

According to one aspect of the present disclosure, display control techniques for controlling display of a peripheral image indicating a traveling environment of a host vehicle based on information acquired by a sensor recognizes the traveling environment. The display control techniques acquire, as host vehicle information related to the host vehicle, at least one of preceding vehicle information indicating presence or absence of a preceding vehicle, vehicle speed information indicating a traveling speed of the host vehicle, and type information indicating a type of a road around the host vehicle. The display control techniques draw the peripheral image in a mode of an overhead view of the host vehicle and change a scale of the peripheral image based on the host vehicle information.

According to one aspect of the present disclosure, since the scale of the peripheral image of an overhead view of the host vehicle is changed based on the road type information, a range around the host vehicle reproduced in the peripheral image can be appropriately adjusted according to the traveling scene. As a result, the peripheral image is capable of presenting the traveling environment around the host vehicle in an easy-to-understand manner.

According to one aspect of the present disclosure, display control techniques for controlling display of a peripheral image indicating a traveling environment of a host vehicle based on information acquired by a sensor recognizes the traveling environment. The display control techniques acquire automated driving information indicating presence or absence of a surroundings monitoring obligation in the automated driving executed in the host vehicle. The display control techniques draw the peripheral image in a mode of an overhead view of the host vehicle and change the scale of the peripheral image in accordance with the presence or absence of the surroundings monitoring obligation in the automated driving being executed.

According to one aspect of the present disclosure, the scale of the peripheral image of overlooking the host vehicle is changed according to the presence or absence of the surroundings monitoring obligation in the automated driving being executed. Therefore, even when the information recognized by the sensor for the automated driving increases, the range around the host vehicle reproduced in the peripheral image can be appropriately adjusted in accordance with an operation state of the automated driving. As a result, the peripheral image is capable of presenting the traveling environment around the host vehicle in an easy-to-understand manner.

According to one aspect of the present disclosure, display control techniques for controlling display of a peripheral image indicating a traveling environment of a host vehicle based on information acquired by a sensor recognizes the traveling environment. The display control techniques grasp an abnormal state of a physical condition occurring in a driver of the host vehicle. The display control techniques draw the peripheral image in a state of an overhead view of the host vehicle and increase a scale of the peripheral image when the abnormal state of the physical condition of the driver is recognized.

According to one aspect of the present disclosure, the scale of the peripheral image of overlooking the host vehicle is increased, and a range around the host vehicle reproduced in the peripheral image is expanded when the abnormal state of the physical condition of the driver is grasped. Therefore, even in a situation in which it is difficult for the driver to directly check the surroundings of the host vehicle, the peripheral image can present the traveling environment around the host vehicle in an easy-to-understand manner.

According to one aspect of the present disclosure, the display control techniques for controlling display of a peripheral image indicating a traveling environment of a host vehicle based on information acquired by a sensor recognizes the traveling environment. The display control techniques acquire, as host vehicle information related to the host vehicle, at least one of vehicle speed information indicating a traveling speed of the host vehicle and type information indicating a type of a road around the host vehicle. The display control techniques draw the peripheral image in a mode of an overhead view of the host vehicle, acquires a different image aligned with the peripheral image, and change an area ratio between the peripheral image and the separate image on display, based on the host vehicle information.

According to one aspect of the present disclosure, the area ratio of the peripheral image and the different image displayed side by side is changed based on the host vehicle information. As described above, the display size of the peripheral image can be appropriately adjusted according to the traveling scene. As a result, the peripheral image is capable of presenting the traveling environment around the host vehicle in an easy-to-understand manner.

According to one aspect of the present disclosure, display control techniques for controlling display of a peripheral image indicating a traveling environment of a host vehicle based on information acquired by a sensor recognizes the traveling environment. The display control techniques acquire automated driving information indicating presence or absence of a surroundings monitoring obligation in the automated driving executed in the host vehicle. The display control techniques draw the peripheral image in a mode of an overhead view of the host vehicle, acquire a different image aligned with the peripheral image, and change an area ratio between the peripheral image and the different image on display in accordance with the presence or absence of the surroundings monitoring obligation in the automated driving being executed.

According to one aspect of the present disclosure, the area ratio of the peripheral image and the different image displayed side by side is changed in accordance with the presence or absence of the surroundings monitoring obligation in the automated driving being executed. Therefore, even when information recognized by the sensor for the automated driving increases, the display size of the peripheral image can be appropriately adjusted according to an operation state of the automated driving. As a result, the peripheral image is capable of presenting the traveling environment around the host vehicle in an easy-to-understand manner.

A function of a display control device according to an embodiment of the present disclosure is implemented in an automated driving computer 100 shown in FIG. 1. The automated driving computer 100 is a high-performance in-vehicle computer that realizes a driving assistance function of supporting driving operation of a driver and an automated driving function capable of performing the driving operation of the driver on behalf of the driver. By mounting the automated driving computer 100, a vehicle (hereinafter referred to as host vehicle A) becomes an automated driving vehicle having an automated driving function.

The driving assistance function described above corresponds to the automated driving function of a level 2 or lower in an automatic driving level defined by Society of Automotive Engineers of America. In the automated driving of the level 2 or lower, the driver is obliged to monitor surroundings. On the other hand, the automated driving function corresponds to the automated driving function of a level 3 or higher in which a system is a control subject. The automated driving of the level 3 or higher is an eyes-off automated driving in which the driver is not obliged to monitor the surroundings. In a period in which the host vehicle A autonomously travels by the automated driving function of the level 3 or higher, the driver may be permitted to perform a specific action (hereinafter referred to as second task) other than driving defined in advance.

The automated driving computer 100 is connected as one node to a communication bus 99 of an in-vehicle network. A peripheral monitoring sensor 30, a locator 35, a driver monitoring unit 38, a vehicle to everything (i.e., V2X) communication device 39, a travel control electronic control unit (i.e., ECU) 40, and the like are connected to the communication bus 99. These nodes connected to the communication bus 99 of the in-vehicle network can communicate with each other. It should be noted that specific nodes among the multiple devices and the multiple ECUs may be directly electrically connected with one another and can communicate with one other without using the communication bus 99.

The peripheral monitoring sensor 30 is an autonomous sensor that monitors a periphery environment of the host vehicle A. The peripheral monitoring sensor 30 is capable of detecting a moving object and a stationary object specified in advance from a detection range around the host vehicle A. The peripheral monitoring sensor 30 is capable of detecting a front vehicle, a rear vehicle, a left vehicle and a right vehicle as other vehicles traveling around the host vehicle A. The peripheral monitoring sensor 30 is capable of further detecting moving objects such as pedestrians and cyclists. Further, the peripheral monitoring sensor 30 is capable of detecting a stationary object such as a road sign, a road surface marking, or a lane marking of a road. The peripheral monitoring sensor 30 provides detection information of objects around the host vehicle to the automated driving computer 100, and the like through the communication bus 99.

The peripheral monitoring sensor 30 includes, for example, camera units 31 and a millimeter wave radar 32. The camera units 31 may have a monocular camera or may have a compound-eye camera. The camera units 31 are mounted on the host vehicle A so as to be capable of imaging a front range, a rear range, a left and right ranges of the host vehicle A. The camera units 31 output at least one of imaging data obtained by imaging surroundings of the host vehicle and an analysis result of the imaging data as detection information. The millimeter wave radar 32 emits a millimeter wave or a quasi-millimeter wave toward periphery, for example, a forward range of the host vehicle. The millimeter wave radar 32 outputs detection information generated by processing to receive a reflected wave reflected by a moving object, a stationary object, or the like. The peripheral monitoring sensor 30 may further include a detection configuration such as a rider and a sonar.

The locator 35 includes a global navigation satellite systems (i.e., GNSS) receiver, an inertial sensor, and the like. The locator 35 combines positioning signal received by the GNSS receiver, measurement result of the inertial sensor, vehicle speed information output to the communication bus 99, and the like, and successively specifies a self-position and a traveling direction of the host vehicle A. The locator 35 sequentially outputs location information and direction information about the host vehicle A based on the specified result to the communication bus 99 as locator information.

The locator 35 further has a map database (hereinafter referred to as map DB) 36. The map DB 36 mainly includes a large-capacity storage medium storing a large number of pieces of three-dimensional map data and two-dimensional map data. The three-dimensional map data is so-called high definition map data, and includes information necessary for driving assistance and automated driving, such as three-dimensional shape information about a road and detailed information about each lane. The locator 35 reads map data around a current position from the map DB 36, and provides it to the automated driving computer 100 and the like with locator information.

The driver monitoring unit 38 includes a near-infrared light source, a near-infrared camera, and a controller that controls them. The driver monitoring unit 38 is installed, for example, on an upper surface of a steering column portion or an upper surface of an instrument panel in a posture in which the near-infrared camera faces a headrest portion of a driver's seat. The near-infrared light source and near-infrared camera may be integrated with a meter display 21 or a center information display (i.e., CID) 22 to be described later so as to be placed in either screen. The driver monitoring unit 38 photographs, with the near-infrared camera, a head of a driver that is irradiated with near-infrared light by the near-infrared light source. An image captured by the near-infrared camera is provided from the controller to the automated driving computer 100 or the like as driver status information indicating state of the driver.

The V2X communication device 39 is a vehicle exterior communication unit mounted on the host vehicle A. The V2X communication device 39 is capable of performing, for example, vehicle-to-vehicle communication, road-to-vehicle communication, cellular communication, and the like. The V2X communication device 39 receives, for example, information indicating relative positions of a target (for example, another vehicle or the like) and a warning target (for example, a pedestrian and a cyclist) around the host vehicle through the road-to-vehicle communication. The V2X communication device 39 receives, for example, the map data around the host vehicle by the cellular communication.

The travel control ECU 40 is an electronic control device that mainly includes a microcontroller. The travel control ECU 40 has at least functions of a brake control ECU, a drive control ECU, and a steering control ECU. The travel control ECU 40 continuously executes a braking force control of each wheel, an output control of an in-vehicle power source, and a steering angle control based on any one of an operation command based on a driving operation by the driver and a control command by the automated driving computer 100. The travel control ECU 40 acquires a detection signal of a wheel speed sensor 41 provided in a hub portion of each wheel. The travel control ECU 40 generates vehicle speed information indicating current traveling speed of the host vehicle A based on a detection signal of a wheel speed sensor 41, and the sequentially outputs the generated traveling speed information to the communication bus 99.

The automated driving computer 100 mainly includes a control circuit including a processing unit 11, a random access memory (i.e., RAM) 12, a storage unit 13, an I/O interface 14, a bus connecting them, and the like. The processing unit 11 is a hardware combined with the RAM 12, and executes arithmetic processing. The processing unit 11 includes at least one arithmetic core, such as a central processing unit (i.e., CPU) or a graphics processing unit (i.e., GPU). The processing unit 11 may further include a field-programmable gate array (i.e., FPGA), a neural network processing unit (i.e., NPU), an IP core having other dedicated functions, and the like. The RAM 12 may include a video RAM for generating video data. The processing unit 11 accesses the RAM 12 to execute various processes for implementing the automated driving control method and a display control method of the present disclosure. The storage unit 13 includes a non-volatile storage medium. The storage unit 13 stores various programs, for example, an automated driving control program and a display control program to be executed by the processing unit 11.

The automated driving computer 100 includes a dead-man determination block 50, a driving control block 60, and an HMI control block 70. The dead-man determination block 50, the driving control block 60, and the HMI control block 70 may have circuit configurations that are physically independent from each other, or may have circuit configurations in which at least partially physically integrated.

The dead-man determination block 50 is a control block for grasping an abnormal state of physical condition occurring in the driver of the host vehicle A. The dead-man determination block 50 automatically detects that it is difficult for the driver to perform driving due to a reason that it is difficult to predict in advance, such as a sudden illness, based on the driver status information about the driver acquired from the driver monitoring unit 38. In order to diagnose that the driver is in a difficult-to-drive state, the dead-man determination block 50 detects an inclination of an upper body of the driver, the inclination of a head with respect to the upper body, and the like, and detects collapse of a posture of the driver. The dead-man determination block 50 determines that it is difficult to drive when the posture collapse of the driver continues for a predetermined time after the posture collapse of the driver is detected.

The dead-man determination block 50 provides abnormality detection information indicating an occurrence of the posture collapse of the driver to the driving control block 60 and the HMI control block 70 when grasping a state in which the posture of the driver has collapsed to a posture inappropriate for driving. Further, when the detection of the posture collapse continues for a predetermined time, the dead-man determination block 50 provides the driving control block 60 and the HMI control block 70 with the abnormality detection information indicating decision of the driving difficulty state (abnormal state).

The driving control block 60 is a control block that realizes a driving assistance function and an automated driving function. The driving control block 60 realizes the driving assistance function, for example, an adaptive cruise control (i.e., ACC), a lane tracking assist (i.e., LTA), and a lane change assist (i.e., LCA). In addition, the driving control block 60 performs driving control corresponding to ACC, LTC, LCA, and the like in a complex manner by the operation of the automated driving function. The driving control block 60 includes an environment recognition unit 61, a behavior determination unit 62, and an operation execution unit 63 as functional units based on the automated driving program.

The environment recognition unit 61 recognizes a traveling environment of the host vehicle A based on the locator information and the map data acquired from the locator 35 and the detection information acquired from the peripheral monitoring sensor 30. More specifically, the environment recognition unit 61 grasps a position of a driver's vehicle lane on which the host vehicle travels among lanes, a lane shape and a travel direction of each lane, and a relative position, relative speed, and others of another vehicle and a pedestrian around the driver's vehicle. The environment recognition unit 61 provides these recognition results and information (hereinafter referred to as sensor reliability information) indicating reliability of detection by the peripheral monitoring sensor 30 to the HMI control block 70.

The behavior determination unit 62 switches a control subject of the driving operation between the driver and a system. The behavior determination unit 62 generates a traveling plan to travel the host vehicle A based on the recognition result of the traveling environment by the environment recognition unit 61 when the system has a right to control the driving operation. The behavior determination unit 62 provides the HMI control block 70 with automated driving information indicating an operating state of automated driving. The automated driving information includes at least information indicating whether the automated driving is being executed and information indicating whether the automated driving being executed has a surroundings monitoring obligation.

The behavior determination unit 62 determines an execution of emergency evacuation control when the driving difficulty state of the driver is finally determined based on the abnormality detection information provided by the dead-man determination block 50. The emergency evacuation control corresponds to a minimal risk maneuver (i.e., MRM) control and a fallback operation control. The emergency evacuation control is an automated driving control in which the system has a control right and stops the host vehicle A at an evacuation place. The evacuation place is set in a lane in which the host vehicle is traveling, on a side of a road (road shoulder) on which the host vehicle is traveling, or the like. For example, an emergency parking zone, a roadside zone, a parking area, or the like may be set as the evacuation place.

The operation execution unit 63 performs acceleration-deceleration control and steering control of the host vehicle A according to the traveling plan generated by the behavior determination unit 62 in cooperation with the travel control ECU 40 when the system has the right to control the driving operation. More specifically, the operation execution unit 63 generates control commands based on the traveling plan, and sequentially outputs the generated control commands to the travel control ECU 40.

The HMI control block 70 is a control block that realizes an input interface function of receiving an operation by an occupant such as the driver and an output interface function of presenting information to the driver. The HMI control block 70 is electrically connected to display devices such as the meter display 21, a CID 22, and a head-up display (hereinafter referred to as HUD) 23, an audio device 24, an operation device 26, and the like shown in FIGS. 1 and 2. The display devices of the host vehicle A may further include each display EMB, EML, EMR (see FIG. 2) of an electronic mirror system.

The meter display 21 and the CID 22 mainly include, for example, a liquid crystal display or an OLED (Organic Light Emitting Diode) display. The CID 22 has a touch panel function and detects a touch operation on a display screen by the driver or the like. The HUD 23 projects light of an image formed in front of the driver onto a projection area AP defined on a windshield WS or the like, thereby allowing the driver to visually recognize a virtual image overlapping with a foreground of the host vehicle A.

The audio device 24 includes a plurality of speakers installed in a vehicle compartment in an arrangement surrounding the driver's seat. The audio device 24 outputs a notification sound, a voice message, or the like from the speakers in the vehicle compartment.

The operation device 26 is an input unit that receives an operation of user, such as the driver or the like. The operation of the user or the like related, for example, to an operation and stop of the automated driving function is input to the operation device 26. The operation device 26 includes a steering switch provided on a spoke portion of a steering wheel, an operation lever provided on a steering column portion, a voice input device that recognizes utterance content of the driver, and the like.

The HMI control block 70 includes functional units that execute the display control program stored in the storage unit 13 by the processing unit 11 to integrally control presentation of information to the driver. More specifically, the HMI control block 70 includes functional blocks such as an information acquisition unit 71, a 3D drawing unit 73, a navigation function unit 74, and a presentation controller 77.

The information acquisition unit 71 acquires various types of information necessary for information presentation to an occupant for example a driver. More specifically, the information acquisition unit 71 acquires vehicle speed information, abnormality detection information, self-position information, road type information, road shape information, automated driving information, sensor reliability information, target detection information, warning target information, and the like. As described above, the vehicle speed information is information indicating the current traveling speed of the host vehicle A. The self-position information is information indicating a position of a driver's vehicle lane.

As described above, the abnormality detection information is information indicating a physical condition abnormality that has occurred in the driver of the host vehicle A.

The road type information includes at least information indicating whether the road on which the vehicle is traveling is a general road or an expressway (or a parking lot) and information indicating a traveling direction of each lane of the road on which the vehicle is traveling. The expressway mentioned here includes a motorway. The road shape information is information indicating a shape of each lane of the road on which the vehicle is traveling, in other words, information indicating the shape of a lane marking or a road edge that partitions each lane. The road shape information may be information based on the recognition result of the lane marking or the road edge provided from the environment recognition unit 61 in addition to the map data provided from the locator 35.

As described above, the automated driving information is information indicating whether there is the surroundings monitoring obligation in the automated driving executed by the driving control block 60. The sensor reliability information is information indicating reliability of sensing by the camera units 31 and the millimeter wave radar 32. For example, information such as reliability high, medium, and low is provided to the information acquisition unit 71 as the sensor reliability information.

The target detection information includes information indicating a type of the target located around the host vehicle A and information indicating the relative position, the relative speed, and the like of each target. In the target detection information, for example, a general vehicle, a large vehicle, a motorcycle, a pedestrian, a cyclist, and the like are recognized as different types. In the target detection information, information indicating whether there is a preceding vehicle traveling in the same lane as the host vehicle A is set as preceding vehicle information. The target detection information may include size information of the target.

The warning target information is information specifying a target (hereinafter referred to as a warning target) having a high risk to the host vehicle A among targets located around the host vehicle A. The warning target is specified from the recognized target based on, for example, a relative distance, the relative speed, a moving direction, and the like with respect to the host vehicle A. A process of specifying the warning target may be performed by the environment recognition unit 61 or may be performed by the information acquisition unit 71. As an example, a pedestrian or the like located in a vicinity of the host vehicle A is specified as the warning target.

Among the acquired information acquired by the information acquisition unit 71, information related to the road around the host vehicle A, such as road type information and road shape information, is the road information. Among the acquired information, the vehicle speed information, the preceding vehicle information, the preceding vehicle type information, and the like are host vehicle information related to the host vehicle A. Further, among the acquired information, the self-position information, the type information, the shape information, the sensor reliability information, the target detection information, the warning target information, and the like are recognition information based on the recognition result of the traveling environment.

The 3D drawing unit 73 draws a peripheral image Dpm (see FIGS. 6 to 12) as one of a plurality of images to be displayed on the display devices. The peripheral image Dpm is an image in which the traveling environment around the host vehicle recognized by the environment recognition unit 61 is visualized in real time, and is an image in which the traveling environment around the host vehicle is reproduced. The peripheral image Dpm is an image in a state in which the host vehicle A is viewed from the rear of the host vehicle A. The 3D drawing unit 73 lays out objects corresponding to the host vehicle A, another vehicle, and the like in a virtual modeling space, and generates a 2D image obtained by capturing an object group from a virtual camera position as a peripheral image Dpm.

In the peripheral image Dpm, a plurality of line icons PIn (see FIG. 6), a host vehicle icon Pv (see FIG. 6), another vehicle icon Po (see FIG. 6), a pedestrian icon Pa (see FIG. 9), and the like are drawn.

Each line icon PIn is drawn using the road shape information, and indicates a plurality of lane markings provided on the road on which the host vehicle is traveling. The driver's vehicle lane VLs in which the host vehicle A travels is reproduced by the line icons PIn drawn on the left and right of the host vehicle icon Pv. The line icons PIn displayed at the left and right ends in the peripheral image Dpm are road edge icons Pre indicating the left and right road edges, respectively. The line icons PIn reproduces each lane of the traveling road in the peripheral image Dpm.

The line icons PIn include a recognition line Li1 and an unrecognized line Li2. The recognition line Li1 is a line icon PIn corresponding to a lane marking (or a road edge) recorded in the map data and recognized by the peripheral monitoring sensor 30. The unrecognized line Li2 is a line icon PIn corresponding to a lane marking that is recorded in the map data but is not recognized by the peripheral monitoring sensor 30. The line icon PIn arranged in the vicinity of the host vehicle icon Pv is the recognition line Li1. On the other hand, the line icon PIn drawn at a position away from the host vehicle icon Pv is the unrecognized line Li2.

The recognition line Li1 and the unrecognized line Li2 are drawn in the peripheral image Dpm in different manners. As an example, the recognition line Li1 and the unrecognized line Li2 are drawn in different display colors or different line types. More specifically, the recognition line Li1 is displayed in a display color having higher brightness or saturation than the unrecognized line Li2. In yet another aspect, the recognition line Li1 is drawn with a solid line, and the unrecognized line Li2 is drawn with a broken line.

The host vehicle icon Pv is a host vehicle image that simulates an appearance shape of an upper surface and a rear surface of the host vehicle A. The host vehicle icon Pv is drawn on the peripheral image in the driver's vehicle lane VLs reproduced between a pair of line icons PIn. The host vehicle icon Pv is arranged slightly below a center of the peripheral image Dpm and indicates a state of the host vehicle A.

The other vehicle icon Po is another vehicle image that simulates the appearance shape of the other vehicle. The other vehicle icon Po is drawn based on target detection information by the camera units 31 or the like that has detected an actual other vehicle. The drawing shape of the other vehicle icon Po may be changed according to a type, size, and the like of the other vehicle recognized by the environment recognition unit 61. The other vehicle icon Po is arranged around the host vehicle icon Pv so that the actual positional relationship between the host vehicle A and the other vehicle is reproduced in the peripheral image Dpm. The other vehicle icon Po notifies the driver of the presence of another vehicle located around the host vehicle.

The pedestrian icon Pa is an image simulating a pedestrian, and is drawn based on the target detection information by the camera units 31 or the like that has detected an actual pedestrian. The pedestrian icon Pa is arranged around the host vehicle icon Pv such that the actual positional relationship between the host vehicle A and the pedestrian is reproduced in the peripheral image Dpm. The pedestrian icon Pa warns the driver of the presence of a pedestrian who is a risk to the host vehicle A.

Figure 3:
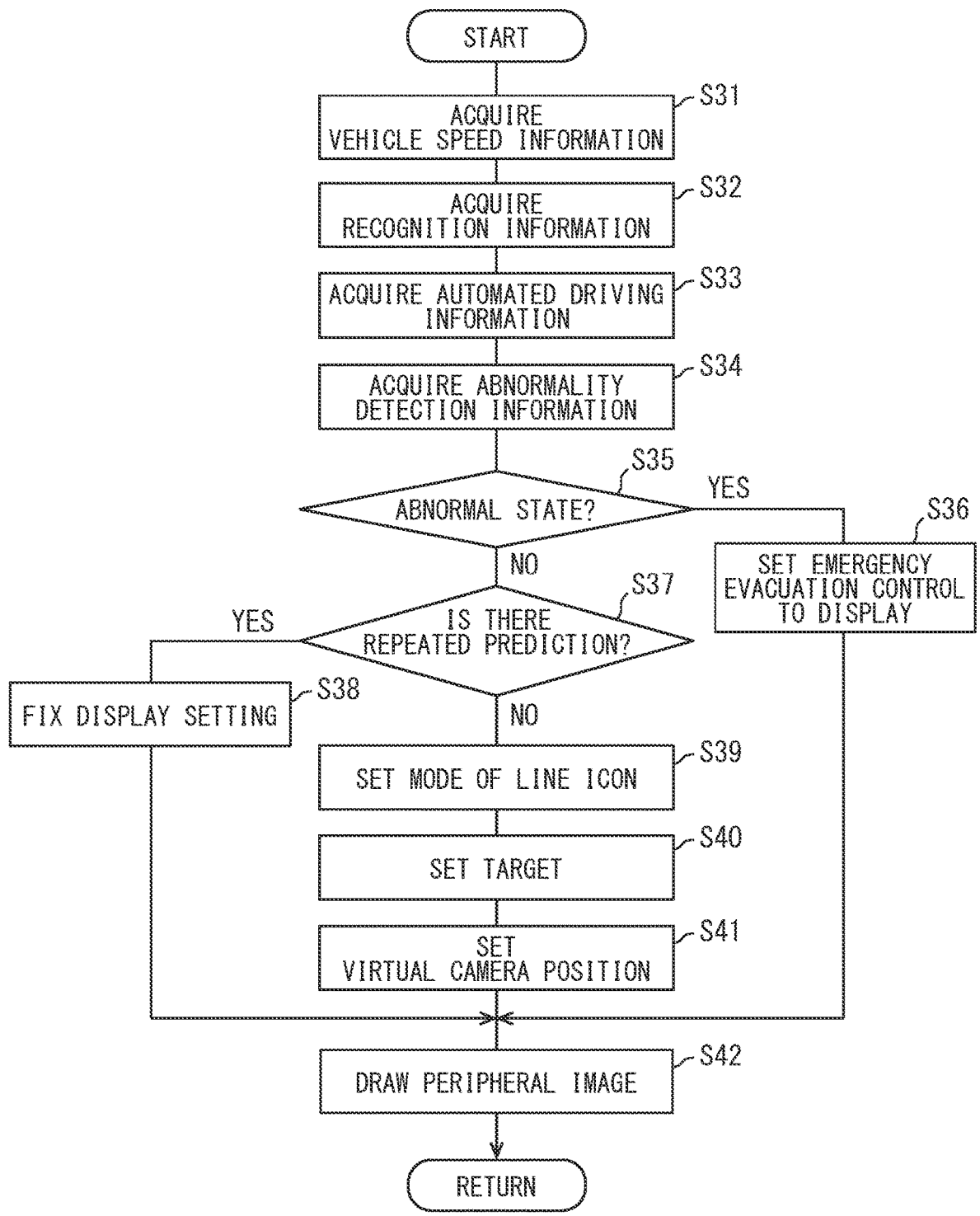
FIG. 3 is a flowchart illustrating details of 3D drawing processing performed by a human-machine interface (i.e., HMI) control block.

The 3D drawing unit 73 draws the peripheral image Dpm described above by performing the 3D drawing process (see FIG. 3). In the 3D drawing process, the peripheral image Dpm is sequentially changed based on the acquired information of the information acquisition unit 71. More specifically, in the 3D drawing process, the number and mode of the line icons PIn drawn in the peripheral image Dpm and the scale and a depression angle of the peripheral image Dpm are changed based on the acquired information. The 3D drawing process is started by activation of the automated driving computer 100, and is repeatedly performed by the information acquisition unit 71 and the 3D drawing unit 73 until the power supply of the automated driving computer 100 is turned off.

In steps S31 to S33 of the 3D drawing process, the information acquisition unit 71 sequentially acquires the vehicle speed information, the recognition information, and the automated driving information. An order in which information are acquired may be changed as appropriate. In step S32, for example, the number (amount) of other vehicles around the host vehicle recognized by the peripheral monitoring sensor 30 is acquired, and it is grasped whether each lane marking around the host vehicle registered in the map data is recognized by the peripheral monitoring sensor 30. In step S33, evacuation control information indicating transition status and execution status to automatic evacuation control (fallback operation) may be acquired as the automated driving information.

In step S34, the information acquisition unit 71 further acquires the abnormality detection information from the dead-man determination block 50. The abnormality detection information corresponds to execution information of fallback operation (automatic traveling by the emergency evacuation control) executed in the host vehicle A. In step S35, the information acquisition unit 71 determines whether an abnormal state of the physical condition of the driver is recognized based on the abnormality detection information. In step S36, the 3D drawing unit 73 enables a display setting for the emergency evacuation control (see FIG. 10) when the information acquisition unit 71 has acquired the abnormality detection information indicating the determination of the driving difficulty state and the abnormal state of the driver has been recognized (YES in step S35). In step S42, the peripheral image Dpm of the scale and the depression angle reflecting the display setting for the emergency evacuation control is drawn.

In step S37, the 3D drawing unit 73 predicts whether display and non-display of the line icons PIn in the peripheral image Dpm are repeated, in other words, whether the number of line icons PIn frequently increases or decreases, based on the information acquired by the information acquisition unit 71. In step S38, the 3D drawing unit 73 fixes the display setting of the peripheral image Dpm when it is predicted that display and non-display of a part of the line icons PIn will be repeated according to the road type, the traffic volume, and the like (YES in step S37), In step S42, the peripheral image Dpm based on the fixed display setting is drawn.

In this case, a change of the number of line icons PIn is stopped, and the number of line icons PIn drawn in the peripheral image Dpm is fixed to a predetermined number or less. The 3D drawing unit 73 may fix a display setting of the peripheral image Dpm by switching the number and the mode of the line icons PIn and the scale and the depression angle of the peripheral image Dpm to predetermined settings. Alternatively, the display setting may be fixed by prohibiting the change of the current display setting.

In step S39, the 3D drawing unit 73 sets a mode of the line icon PIn to be drawn in the peripheral image Dpm based on the information acquired by the information acquisition unit 71. More specifically, in step S39, the number of line icons PIn and whether each line icon PIn is to be displayed in the recognition line Li1 or the non-recognition line Li2 are determined.

In step S40, the 3D drawing unit 73 sets a target to be notified or warned using the other vehicle icon Po, the pedestrian icon Pa, and the like based on the recognition information acquired by the information acquisition unit 71. In step S40, objects corresponding to the lane marking, the host vehicle A, other vehicles, a pedestrian, and the like are arranged in a virtual layout space. Further, in step S41, the 3D drawing unit 73 sets a virtual camera position based on the information acquired by the information acquisition unit 71. In step S41, the depression angle, the scale, and the like of the peripheral image Dpm are set. The 3D drawing unit 73 sets the scale of the peripheral image Dpm by giving priority to information having a high priority set in advance among the preceding vehicle information, the vehicle speed information, the type information, and the like. Then, in step S42, the peripheral image Dpm of a bird's-eye viewpoint based on the host vehicle icon Pv is drawn.

The navigation function unit 74 has a navigation function of performing route guidance from a current position to a destination. The navigation function unit 74 draws a route image Drt (see FIGS. 11 and 12) for the route guidance. The route image Drt includes a map image Pm serving as a background, a planned route Prt, the host vehicle mark Ps (see FIG. 11), and the like. The planned route Prt indicates a route to the destination on the map image Pm. The host vehicle mark Ps indicates a position of the host vehicle A on the map image Pm. The route image Drt is displayed on at least one of the meter display 21 and the CID 22. An occupant, for example a driver, can switch a display area of the route image Drt between the meter display 21 and the CID 22.

Figure 4:
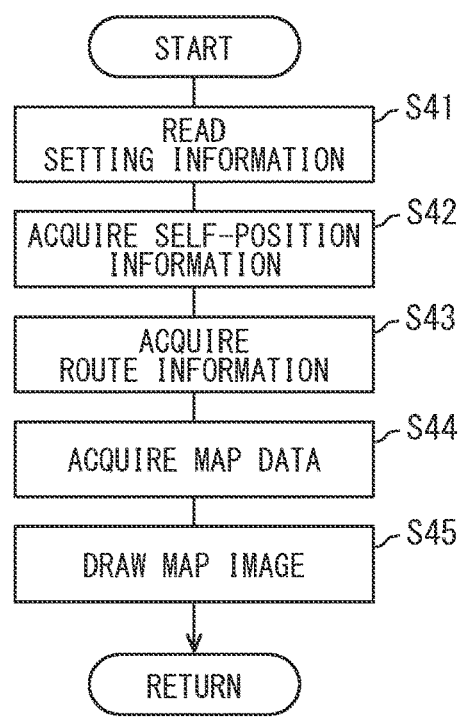
FIG. 4 is a flowchart illustrating details of map drawing processing performed by the HMI control block.

The navigation function unit 74 performs a map drawing process (see FIG. 4) of drawing the route image Drt. The map drawing process is started based on a setting of the destination by the driver, and is continuously performed by the information acquisition unit 71 and the navigation function unit 74 until the route guidance to the destination is completed.

In step S41 of the map drawing process, the navigation function unit 74 reads setting information of the route image Drt. More specifically, the navigation function unit 74 reads, as the setting information, information indicating which of the meter display 21 and the CID 22 displays the route image Drt and size in which the route image Drt is displayed. Further, in steps S42 to S44, the navigation function unit 74 sequentially acquires the self-position information, the route information to the destination, and the map data around the host vehicle. The order of acquisition may be changed as appropriate. Then, in step S45, the navigation function unit 74 draws a map image around the host vehicle having a predetermined resolution (drawing size) by combining the setting information, the self-position information, the route information, the map data, and the like.

The presentation controller 77 integrally controls presentation of information to the driver that uses each display device and the audio device 24. The presentation controller 77 has a mediation function of mediating information to be presented to the driver, and a data generation function of generating video data and voice data based on the mediation result. As the mediation function, the presentation controller 77 sets priority for each content to be a presentation candidate based on various acquired information acquired by the information acquisition unit 71. The presentation controller 77 selects the content determined to have a high priority as a target to be provided to the driver. As the data generation function, the presentation controller 77 generates a control signal and video data to be provided to each display devices and a control signal and voice data to be provided to the audio device 24 based on the result of selecting the content.

Figure 5:
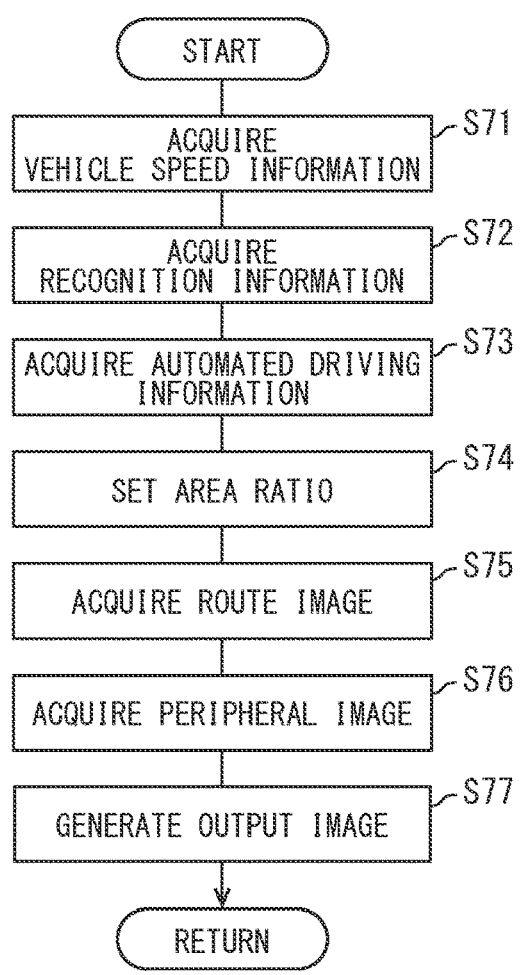
FIG. 5 is a flowchart illustrating details of image synthesizing processing performed by the HMI control block.

When a display mode (synthetic display mode, see FIG. 11) in which both the peripheral image Dpm and the route image Drt are displayed on the meter display 21 is selected, the presentation controller 77 performs the image synthesizing process (see FIG. 5). In the image synthesizing process, an output image Dci (see FIG. 11) in which the peripheral image Dpm and the route image Drt are arranged in a horizontal direction (left and right) is generated. Further, in the image synthesizing processing, an area ratio between the peripheral image Dpm and the route image Drt is sequentially changed based on the acquisition information of the information acquisition unit 71. The image synthesizing processing is started based on an input of a user operation of selecting the synthetic display mode, and is continued by the information acquisition unit 71, the presentation controller 77, and the like until the synthetic display mode is canceled or the route guidance is ended.

In steps 71 to 73 of the output image Dci, the information acquisition unit 71 sequentially acquires the vehicle speed information, the recognition information, and the automated driving information. In this case, the acquisition order of the pieces of information may be changed as appropriate. In step S74, the presentation controller 77 sets the area ratio between the peripheral image Dpm and the route image Drt on the display based on the acquired information of the information acquisition unit 71. In steps S75 and S76, the presentation controller 77 acquires image data of the route image Drt and the peripheral image Dpm from the navigation function unit 74 and the 3D drawing unit 73, respectively. Then, in step S77, the presentation controller 77 synthesizes the route image Drt and the peripheral image Dpm according to the set area ratio to generate the output image Dci.

Figure 2:
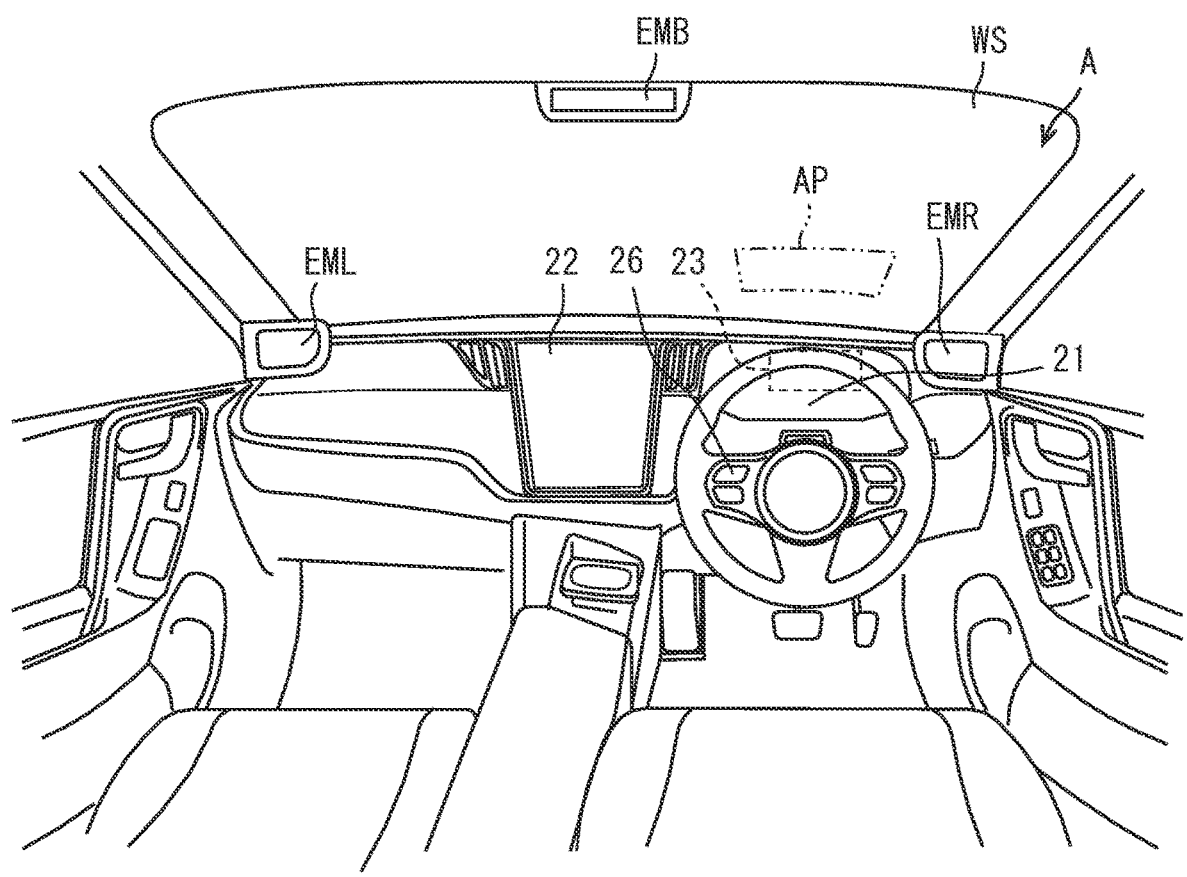
FIG. 2 is a diagram showing an example of a layout of interfaces around a driver's seat.

Next, details of a specific scene in which an increase or decrease in the number of line icons PIn (see step S39 in FIG. 3) and a change in the depression angle, the scale, and the like of the peripheral image Dpm (see step S41 in FIG. 3) occur will be further described based on FIGS. 6 to 10 with reference to FIGS. 1 and 2.

Figure 6:
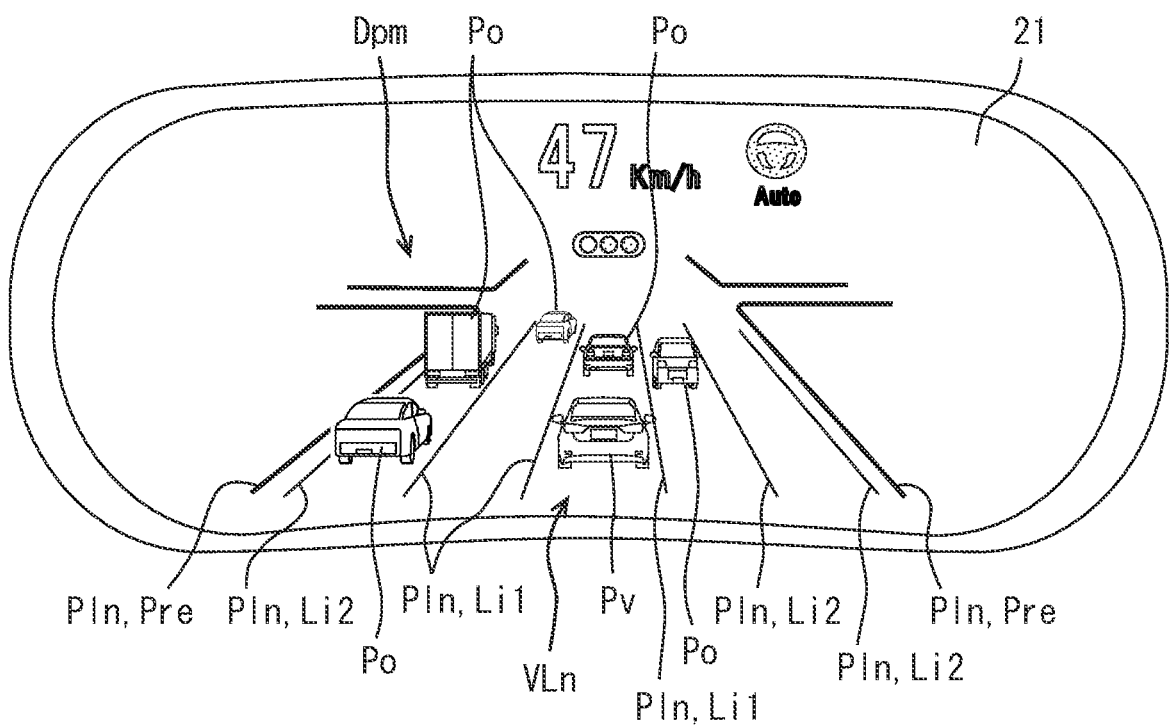
FIG. 6 is a diagram illustrating a display example of a peripheral image.

The peripheral image Dpm shown in FIG. 6 is an image displayed in a scene in which the vehicle travels on a general road by automated driving without a surroundings monitoring obligation. The 3D drawing unit 73 changes the number of line icons PIn drawn in the peripheral image Dpm in accordance with whether there is the surroundings monitoring obligation in the automated driving being executed (see step S39 in FIG. 3). The 3D drawing unit 73 increases the number of line icons PIn to be drawn in the peripheral image Dpm in a case where the automated driving without the surroundings monitoring obligation is executed in the host vehicle A, as compared with a case where the automated driving with the surroundings monitoring obligation is executed in the host vehicle A (see FIG. 7).

In addition, the 3D drawing unit 73 changes the number of line icons PIn drawn in the peripheral image Dpm based on the road type information (see step S39 in FIG. 3). In a case where the road on which the vehicle is traveling is a general road, the 3D drawing unit 73 increases the number of line icons PIn drawn in the peripheral image Dpm as compared with a case where the road on which the vehicle is traveling is an expressway (see FIG. 7).

Further, the 3D drawing unit 73 changes the number of line icons PIn drawn in the peripheral image Dpm according to the number of other vehicles traveling around the host vehicle A on the basis of the recognition information of the other vehicles (see step S39 in FIG. 3). The 3D drawing unit 73 refers to the recognition information and grasps the number of left vehicles and right vehicles traveling on left and right sides, particularly on the adjacent lane, among the other vehicles around the host vehicle. The 3D drawing unit 73 increases the number of line icons PIn drawn in the peripheral image Dpm as the number of other vehicles (In particular, a left vehicle and a right vehicle) traveling around the host vehicle A increases.

As described above, in a traveling scene shown in FIG. 6, the 3D drawing unit 73 draws the line icons PIn corresponding to all the lane markings and road edges recognized based on the detection information of the peripheral monitoring sensor 30, the map data, and the like in the peripheral image Dpm. That is, a display of the line icon PIn is not omitted during the eyes-off automated driving. As a result, all the lanes are reproduced in the peripheral image Dpm by the line icons PIn including the road edge icons Pre.

In addition, the 3D drawing unit 73 changes the scale of the peripheral image Dpm according to whether there is the surroundings monitoring obligation in the automated driving being executed (see step S41 in FIG. 3). The 3D drawing unit 73 reduces the scale of the peripheral image Dpm and displays a wide range of situation viewed from a high viewpoint in the peripheral image Dpm in a case where the automated driving without the surroundings monitoring obligation is executed in the host vehicle A, as compared with a case where the automated driving with the surroundings monitoring obligation is executed in the host vehicle A (see FIG. 7). In addition, the 3D drawing unit 73 changes the scale of the peripheral image Dpm based on the host vehicle information (see step S41 in FIG. 3). The 3D drawing unit 73 sets the scale of the peripheral image Dpm to be smaller in a case where the preceding vehicle is present than in a case where the preceding vehicle is not present (see FIG. 7), based on the preceding vehicle information that is the host vehicle information.

As described above, in the traveling scene shown in FIG. 6, a large number of other vehicle icons Po are arranged in each lane reproduced by the line icons PIn. As a result, a wide range of information around the host vehicle can be grasped from the positional relationship between the host vehicle icon Pv and each of the other vehicle icons Po in the peripheral image Dpm. For example, the peripheral image Dpm can present not only a situation of the adjacent lane of the driver's vehicle lane VLs but also a situation of the lane away from the driver's vehicle lane VLs. Further, the peripheral image Dpm is capable of providing the driver with a situation further away than the preceding vehicle.

Figure 7:
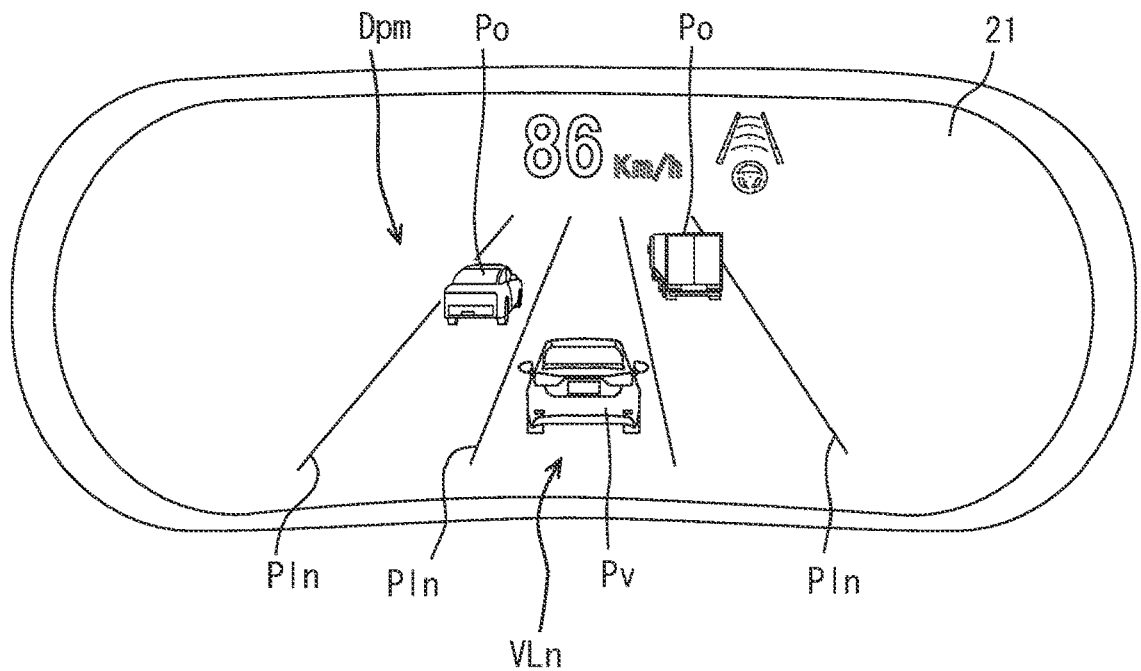
FIG. 7 is a diagram illustrating a display example of a peripheral image.

The peripheral image Dpm shown in FIG. 7 is an image displayed in a scene in which the vehicle travels on an expressway by automated driving with the surroundings monitoring obligation. The 3D drawing unit 73 reduces the number of line icons PIn to be drawn in the peripheral image Dpm based on the automated driving information in a case where the automated driving with the surroundings monitoring obligation is executed (see step S39 in FIG. 3), as compared with a case where the automated driving without the surroundings monitoring obligation is executed (see FIG. 6). In addition, the 3D drawing unit 73 reduces the number of line icons PIn drawn in the peripheral image Dpm based on the road type information in a case where the road on which the vehicle is traveling is an expressway (see step S39 in FIG. 3), as compared with a case where the road on which the vehicle is traveling is a general road (see FIG. 6).

As described above, in the traveling scene shown in FIG. 7, the 3D drawing unit 73 draws only the line icons PIn corresponding to a part of the lane marking recognized based on the detection information, the map data, and the like in the peripheral image Dpm. As an example, the road edge icons Pre (see FIG. 6) indicating the road edge are not drawn, and only the pair of line icons PIn partitioning the driver's vehicle lane VLs and the respective line icons PIn reproducing the adjacent lanes on the left and right sides are drawn in the peripheral image Dpm.

In addition, the 3D drawing unit 73 increases the scale of the peripheral image Dpm in a case where the automated driving without the surroundings monitoring obligation is executed in the host vehicle A (see step 41 in FIG. 3), as compared with a case where the automated driving with the surroundings monitoring obligation is executed in the host vehicle A (see FIG. 7). In addition, based on the preceding vehicle information, the 3D drawing unit 73 increases the scale of the peripheral image Dpm in a case where there is no preceding vehicle (see FIG. 7), as compared with a case where there is a preceding vehicle (see step S41 in FIG. 3).

As described above, in the traveling scene shown in FIG. 7, a detailed situation in the vicinity of the host vehicle viewed from the low viewpoint is reproduced in the peripheral image Dpm. As a result, for example, the positional relationship between the host vehicle icon Pv and each of the other vehicle icons Po in the peripheral image Dpm allows the situation of the other vehicle traveling in the adjacent lane to be presented in an easy-to-understand manner.

The 3D drawing unit 73 completes a mode change of the peripheral image Dpm before the presence or absence of the surroundings monitoring obligation in the automated driving is changed. For example, in a case of shifting from the automated driving with the surroundings monitoring obligation to the automated driving without the monitoring obligation, the 3D drawing unit 73 first performs a display change of increasing the number of drawn line icons PIn while zooming out rearward and upward from the host vehicle icon Pv. Then, after the mode change of the peripheral image Dpm is completed, a level switching of the automated driving control is performed. Similarly, also in a case of shifting from the automated driving without the surroundings monitoring obligation to the automated driving with the surroundings monitoring obligation, the 3D drawing unit 73 first performs a display change of reducing the number of drawn line icons PIn while zooming in toward the host vehicle icon Pv. Then, after the mode change of the peripheral image Dpm is completed, a level switching of the automated driving control is performed.

Figure 8:
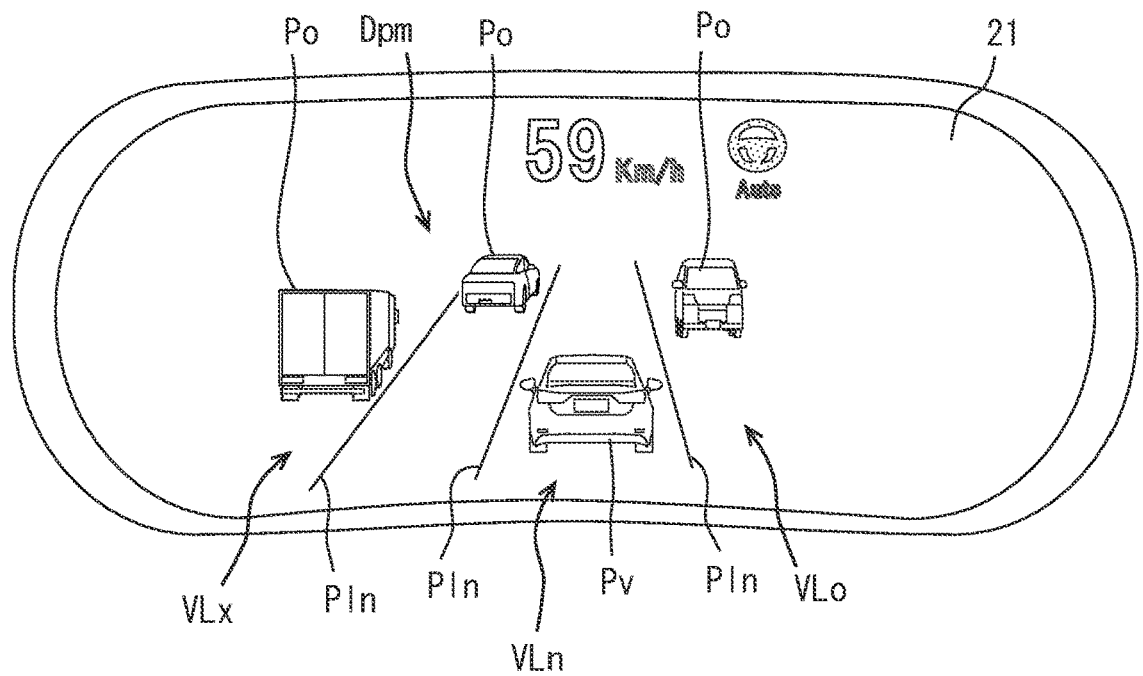
FIG. 8 is a diagram illustrating a display example of a peripheral image.

The peripheral image Dpm shown in FIG. 8 is an image displayed in another scene in which the vehicle travels on a general road by the automated driving without the surroundings monitoring obligation. The 3D drawing unit 73 stops drawing the line icon PIn indicating a lane in which the traveling direction is different from that of the host vehicle A when the number of lanes of the road on which the vehicle is traveling exceeds a predetermined number. As an example, the 3D drawing unit 73 sets a branch lane Lnx branching from the driver's vehicle lane VLs and an opposite lane VLo facing the driver's vehicle lane VLs as lanes having different traveling directions, and hides the line icons Pln on the left and right sides. In this case, the 3D drawing unit 73 also hides the road edge icons Pre. The 3D drawing unit 73 enlarges the periphery of the host vehicle icon Pv in the peripheral image Dpm when reducing the number of line icons Pln drawn in the peripheral image Dpm.

In addition, the 3D drawing unit 73 maintains the number of other vehicle icons Po in the peripheral image Dpm even when the number of line icons Pln drawn in the peripheral image Dpm is reduced. Therefore, even in a scene in which the line icons Pln partitioning the branch lane Lnx and the opposite lane VLo are not displayed, the display of the other vehicle icons Po of the branch lane Lnx and the opposite lane VLo is continued.

The 3D drawing unit 73 hides the line icon Pln or the road edge icons Pre away from the driver's vehicle lane VLs, and then displays the pedestrian icon Pa (see FIG. 9) when the warning target information in which the warning target such as a pedestrian is detected is acquired. The 3D drawing unit 73 increases the number of line icons Pln drawn in the peripheral image Dpm in accordance with a start of display of the pedestrian icon Pa. The 3D drawing unit 73 redisplays the road edge icons Pre or the line icon Pln in the vicinity of the pedestrian icon Pa.

Figure 9:
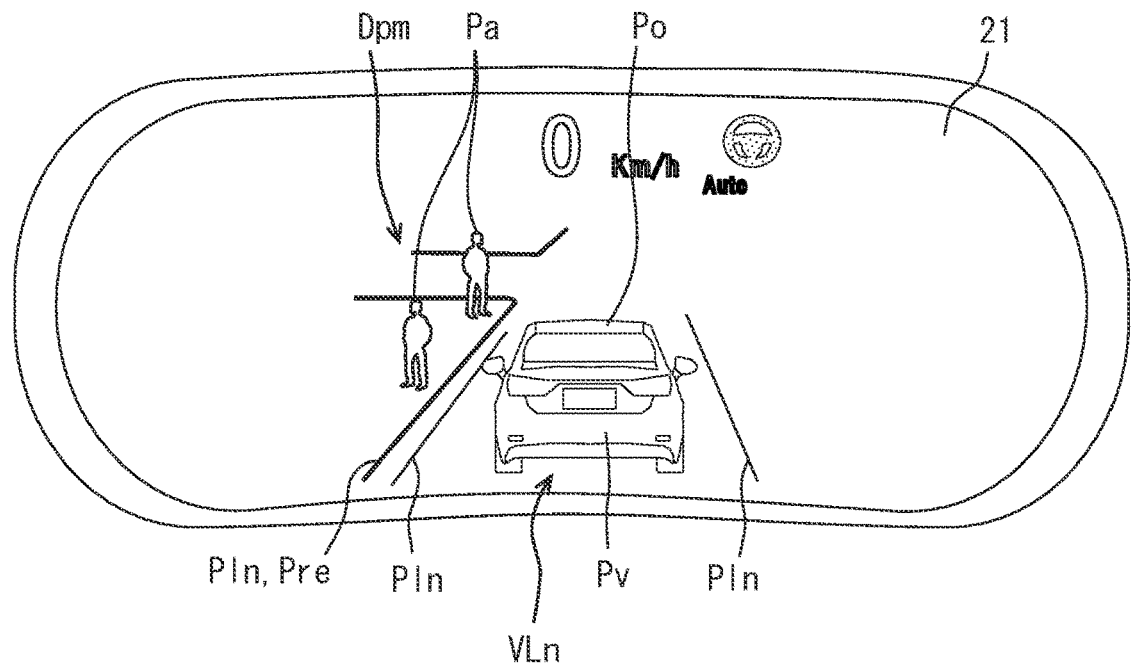
FIG. 9 is a diagram illustrating a display example of a peripheral image.

The peripheral image Dpm shown in FIG. 9 is an image displayed in a scene in which the vehicle travels on the most sidewalk side lane of the general road by automated driving or manual driving with the surroundings monitoring obligation. The 3D drawing unit 73 further draws the pedestrian icon Pa indicating the presence of the warning target, for example a pedestrian, in the peripheral image Dpm using the warning target information. When a plurality of pedestrians are detected, the 3D drawing unit 73 displays a plurality of pedestrian icons Pa in the peripheral image Dpm according to the relative positions of the pedestrians.

In addition, the 3D drawing unit 73 increases the scale of the peripheral image Dpm when the host vehicle A is traveling on the sidewalk side lane closest to the sidewalk side based on the self-position information. Further, when the host vehicle A temporarily stops or the traveling speed is less than a predetermined low speed threshold, the 3D drawing unit 73 increases the scale of the peripheral image Dpm to be larger than that when the traveling speed exceeds the low speed threshold based on the vehicle speed information that is the host vehicle information. As described above, the periphery of the host vehicle icon Pv is enlarged in the peripheral image Dpm. As a result, the positional relationship between the pedestrian icon Pa and the host vehicle icon Pv is emphasized, and an approach of the pedestrian to the host vehicle A is warned by the peripheral image Dpm.

Further, based on the self-position information and the road type information indicating whether the driver's vehicle lane is adjacent to a merging lane, the 3D drawing unit 73 sets the scale of the peripheral image Dpm to be smaller in a scene in which the driver's vehicle lane is adjacent to the merging lane than in a scene in which the driver's vehicle lane is not adjacent to the merging lane. Thus, since a wide range of situations viewed from a high viewpoint is displayed in the peripheral image Dpm, the other vehicle traveling in the merging lane is alerted at an early stage by the other vehicle icon Po.

The 3D drawing unit 73 changes the scale of the peripheral image Dpm according to the reliability of recognition by the peripheral monitoring sensor 30. More specifically, even when the scale of the peripheral image Dpm is set to be small, when the reliability of the sensor recognition is low, the 3D drawing unit 73 changes a range of the periphery of the host vehicle reproduced in the peripheral image Dpm to be narrow. On the other hand, when the reliability of the sensor recognition is high, the 3D drawing unit 73 sets a wide range around the host vehicle reproduced in the peripheral image Dpm.

Figure 10:
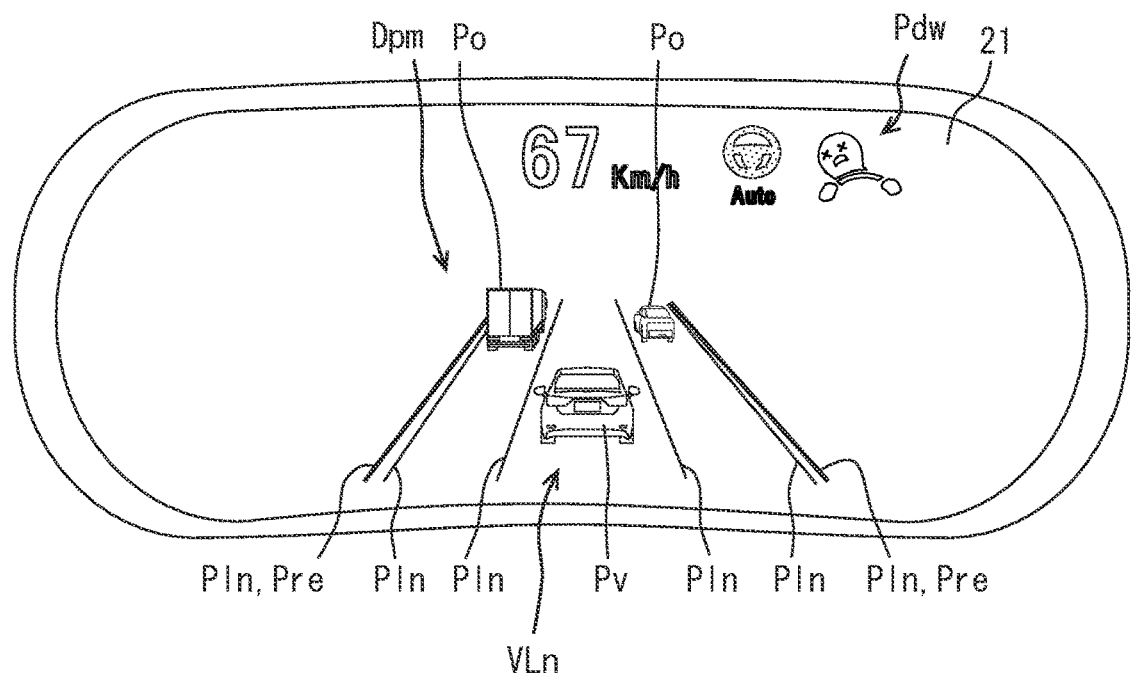
FIG. 10 is a diagram illustrating a display example of a peripheral image when a physical condition abnormality of a driver is detected.

The peripheral image Dpm shown in FIG. 10 is an image displayed based on the display setting for the emergency evacuation control (step S36 in FIG. 3) when the abnormal state of the physical condition of the driver is recognized (step S35 in FIG. 3: YES). The 3D drawing unit 73 increases the scale of the peripheral image Dpm based on the information of the lane markings recorded in the map data until all the line icons Pln are drawn at the maximum bird's-eye view. The 3D drawing unit 73 displays a posture collapse icon Pdw on the meter display 21 based on the abnormality detection information indicating an occurrence of the posture collapse of the driver. Further, the 3D drawing unit 73 starts a movement of the virtual viewpoint at a timing when the execution of the fallback operation (emergency evacuation control) is determined based on the abnormality detection information indicating the determination of a driving difficulty state, and changes the scale of the peripheral image Dpm to the maximum. Then, based on the start of the fallback operation, the 3D drawing unit 73 sequentially performs a display change of increasing the number of line icons Pln and a display change of adding another vehicle icon Po corresponding to another vehicle around the host vehicle.

Figure 11:
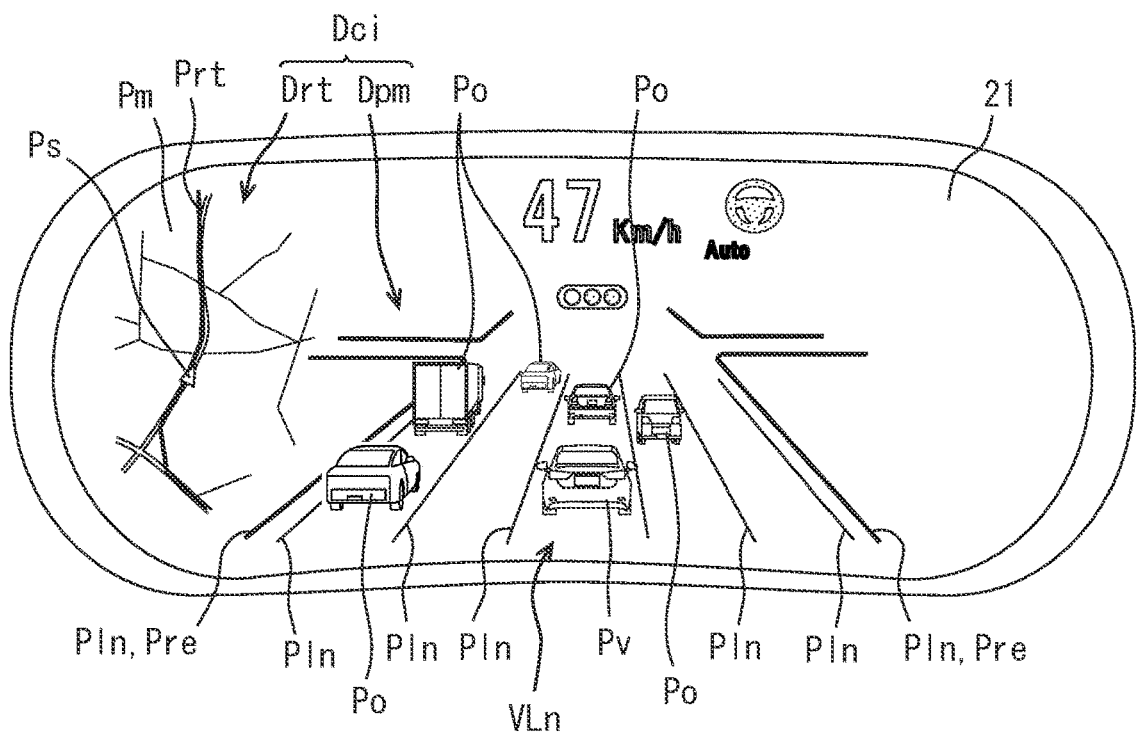
FIG. 11 is a diagram illustrating a display example of an output image.
Figure 12:
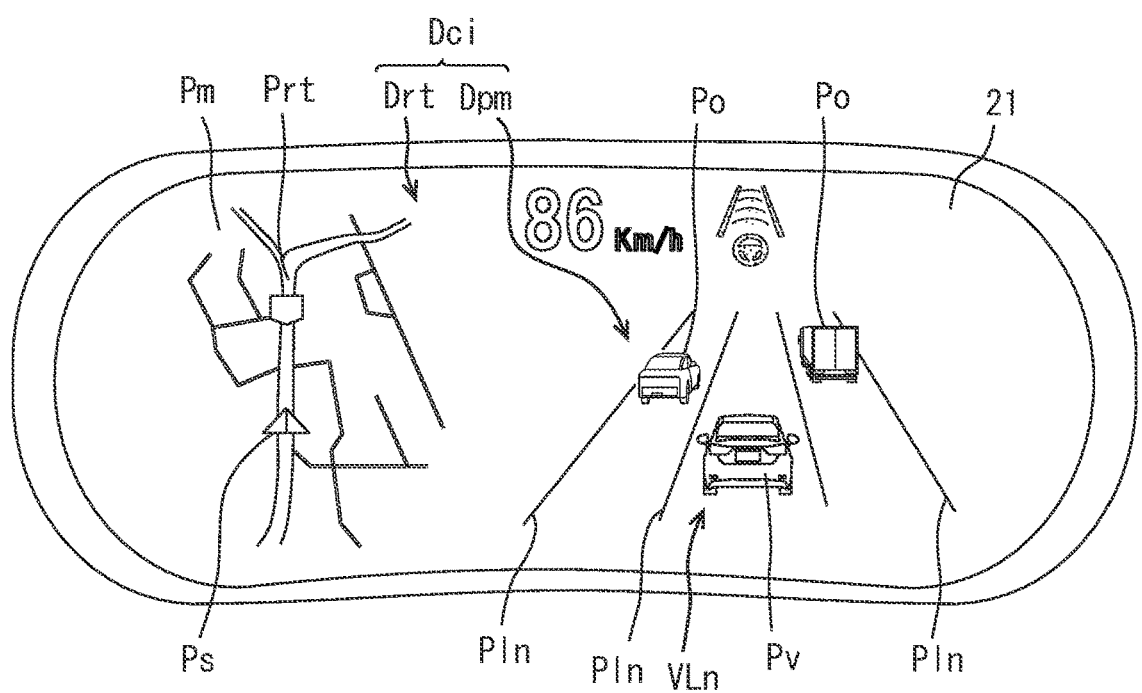
FIG. 12 is a diagram illustrating a display example of an output image.

Next, details of a specific scene in which the area ratio of the output image Dci is changed will be further described based on FIGS. 11 and 12 with reference to FIGS. 1 and 2.

The output image Dci shown in FIG. 11 is an image displayed in a scene in which the vehicle travels on a general road by automated driving without the surroundings monitoring obligation. Based on the automated driving information, the presentation controller 77 changes the area ratio between the peripheral image Dpm and the route image Drt in accordance with the presence or absence of the surroundings monitoring obligation in the automated driving being executed (see step S74 in FIG. 5). The presentation controller 77 increases the area ratio of the peripheral image Dpm in the output image Dci in a case where the automated driving without the surroundings monitoring obligation is executed in the host vehicle A, as compared with a case where the automated driving with the surroundings monitoring obligation is executed in the host vehicle A (see FIG. 12).

In addition, the presentation controller 77 changes the area ratio between the peripheral image Dpm and the route image Drt on the display based on the host vehicle information (see step S74 in FIG. 5). The presentation controller 77 increases the area ratio of the peripheral image Dpm in the output image Dci when the host vehicle A travels at a speed lower than the low speed threshold based on the vehicle speed information. The presentation controller 77 increases the area ratio of the peripheral image Dpm in the output image Dci when the host vehicle A is traveling on a general road based on the road type information. The presentation controller 77 is capable of increasing the area ratio of the peripheral image Dpm in the output image Dci even when it is determined that the host vehicle A is traveling in a parking lot based on the road type information.

As described above, the presentation controller 77 sets a display area of the peripheral image Dpm to be larger than the display area of the route image Drt. The peripheral image Dpm is displayed in the middle area of the display screen of the meter display 21. On the other hand, the route image Drt is displayed in a peripheral portion of the display screen of the meter display 21 in a manner that does not hinder visual recognition of the peripheral image Dpm.

The output image Dci shown in FIG. 12 is an image displayed in a scene in which the vehicle travels on an expressway by automated driving with the surroundings monitoring obligation. The presentation controller 77 sets the area ratio of the peripheral image Dpm in the output image Dci to be lower when the automated driving with the surroundings monitoring obligation is executed in the host vehicle A than when the automated driving without the surroundings monitoring obligation is executed in the host vehicle A (see FIG. 11). In addition, the presentation controller 77 lowers the area ratio of the peripheral image Dpm in the output image Dci when the host vehicle A is traveling on an expressway based on the vehicle speed information.

As described above, the presentation controller 77 sets the display area of the peripheral image Dpm and the display area of the route image Drt to be approximately the same. For example, the peripheral image Dpm is displayed in a right half of the display screen of the meter display 21. On the other hand, the route image Drt is displayed in a left half of the display screen of the meter display 21.

As described above, In the present embodiment, the number of line icons PIn drawn in the peripheral image Dpm is changed based on the road type information. Therefore, content of the peripheral image Dpm can be simplified according to a traveling scene. As a result, the peripheral image Dpm is capable of presenting a traveling environment around the host vehicle in an easy-to-understand manner.

In addition, in the present embodiment, when the type information indicating the traveling direction of each lane of the road is acquired and the number of lanes of the road exceeds the predetermined number, the 3D drawing unit 73 stops drawing the line icon PIn indicating the lane whose traveling direction is different from that of the host vehicle A. As described above, when the drawing of the line icon PIn having low importance is stopped, the content of the peripheral image Dpm can be simplified. Therefore, an easy-to-understand peripheral image Dpm can be presented.

Further, in the present embodiment, when the type information indicating whether the road is a general road or an expressway is acquired and the road on which the vehicle is traveling is an expressway, the 3D drawing unit 73 reduces the number of line icons PIn drawn in the peripheral image Dpm as compared with the case where the road is a general road. According to the above, information on a side and a far side whose importance decreases on the expressway can be omitted from the peripheral image Dpm. As a result, the peripheral image Dpm becomes an easy-to-understand display capable of selectively providing necessary information.

Further, in the present embodiment, when the road on which the vehicle is traveling is a general road, the road edge icons Pre as the line icon PIn indicating the road edge is drawn in the peripheral image Dpm. The road edge icons Pre are not drawn when the vehicle travels on an expressway. According to the above, on a general road where a pedestrian or the like is present on a side of the road, the driver can be notified of the details of the surroundings of the host vehicle by clearly indicating the road edge. On the other hand, in an expressway where there is no pedestrian or the like, the peripheral image Dpm can be simplified.

In addition, in the present embodiment, the number of line icons PIn drawn in the peripheral image Dpm is changed according to the presence or absence of the surroundings monitoring obligation in the automated driving being executed. Therefore, even when the information recognized by the sensor for the automated driving increases, the content of the peripheral image Dpm can be simplified in accordance with the operation state of the automated driving. As a result, the peripheral image Dpm is capable of presenting a traveling environment around the host vehicle in an easy-to-understand manner.

In addition, in the present embodiment, when the automated driving of the level 2 or lower with the surroundings monitoring obligation is executed in the host vehicle A, the number of line icons PIn drawn in the peripheral image Dpm is reduced as compared with the case where the automated driving without the surroundings monitoring obligation is executed in the host vehicle A. During the automated driving with the surroundings monitoring obligation, the driver should actually monitor the surroundings of the host vehicle. Therefore, in a case where the surroundings monitoring obligation is imposed, it is possible to appropriately simplify the peripheral image Dpm by deleting a part of the line icons PIn.

Further, the 3D drawing unit 73 of the present embodiment completes the change of the number of line icons PIn drawn in the peripheral image Dpm before the presence or absence of the surroundings monitoring obligation in the automated driving is changed. In this way, when information amount of the peripheral image Dpm is increased or decreased before the state of automated driving is switched, the driver can grasp necessary peripheral information from the peripheral image Dpm at an early stage at the time of driving change.

In addition, in the present embodiment, the host vehicle icon Pv indicating the host vehicle A is further drawn in the driver's vehicle lane VLs reproduced in the peripheral image Dpm by the line icon PIn. The 3D drawing unit 73 enlarges the periphery of the host vehicle icon Pv in the peripheral image Dpm when reducing the number of line icons PIn drawn in the peripheral image Dpm. As described above, the 3D drawing unit 73 can maintain the scale of the peripheral image Dpm in an easily viewable state by zooming in or zooming out according to the increase or decrease in the number of line icons PIn.

In the present embodiment, the other vehicle icon Po indicating the other vehicle or the like is further drawn in the peripheral image Dpm based on the target detection information of a sensor that detects the target such as the other vehicle or the like located around the host vehicle A. The 3D drawing unit 73 maintains the number of other vehicle icons Po even when reducing the number of line icons PIn drawn in the peripheral image Dpm. In this way, by not reducing the other vehicle icon Po for notifying the other vehicle, the presentation of useful information can be continued to the driver even when the peripheral image Dpm is simplified.

Further, in the present embodiment, the pedestrian icon Pa indicating the pedestrian or the like is further drawn in the peripheral image Dpm based on the warning target information of the sensor that detects the warning target such as the pedestrian or the like located around the host vehicle A. The 3D drawing unit 73 increases the number of line icons PIn drawn in the peripheral image Dpm when drawing the pedestrian icon Pa. Such the increase in the number of line icons PIn makes it easier to grasp the relative position of the pedestrian or the like associated with the pedestrian icon Pa through the peripheral image Dpm.

In addition, in the present embodiment, the number of line icons PIn drawn in the peripheral image Dpm is changed according to the number of other vehicles traveling around the host vehicle. Therefore, the peripheral image Dpm is changed to a mode in which the other vehicle is easily grasped in accordance with a change in traffic volume around the host vehicle. As a result, the peripheral image Dpm is capable of presenting the positional relationship between the host vehicle A and another vehicle around the host vehicle in an easy-to-understand manner.

In the present embodiment, as the number of other vehicles traveling around the host vehicle A increases, the number of line icons PIn drawn in the peripheral image Dpm increases. As a result, driving environment in a wide range around the host vehicle is reproduced in the peripheral image Dpm, even if there are many other vehicles are the host vehicle, the positional relationship between the host vehicle A and the other vehicles can be presented in an easy-to-understand manner.

Further, in the present embodiment, when it is predicted that the increase and decrease in the number of line icons PIn drawn in the peripheral image Dpm are repeated, the change in the number of line icons PIn is stopped. For example, in a case where detection environment of the peripheral monitoring sensor 30 is not good, such as a case where a white line on the road surface is blurred or weather is bad, it is predicted that the display content change of the peripheral image Dpm is repeated. In such the traveling scene, if the number of line icons PIn or the like is fixed, it is possible to avoid a situation in which the driver feels a change in the display content of the peripheral image Dpm troublesome.

In addition, in the present embodiment, the recognition line Li1 corresponding to the lane marking recognized by the peripheral monitoring sensor 30 and the unrecognized line Li2 corresponding to the lane marking not recognized by the peripheral monitoring sensor 30 are drawn in different modes. According to such the display, it is possible to clearly indicate to the driver that the increase or decrease of the line icon PIn does not occur depending on whether the peripheral image Dpm is recognized by the peripheral monitoring sensor 30. Therefore, a situation in which the driver misunderstands that environment recognition ability of the peripheral monitoring sensor 30 is low is avoided.

In addition, in the present embodiment, the scale of the peripheral image Dpm in a mode of an overhead view of the host vehicle A is changed based on the road type information. Therefore, a range around the host vehicle reproduced in the peripheral image Dpm can be appropriately adjusted according to a traveling scene. As a result, the peripheral image Dpm is capable of presenting a traveling environment around the host vehicle in an easy-to-understand manner.

Further, in the present embodiment, based on the vehicle speed information, when the host vehicle A has stopped or when the traveling speed is less than the predetermined low speed threshold, the 3D drawing unit 73 increases the scale of the peripheral image Dpm compared to when the traveling speed exceeds the low speed threshold. According to the above, when the host vehicle is stopped or traveling at the low speed, the details of the surroundings of the host vehicle can be displayed in the peripheral image Dpm. As a result, the peripheral image Dpm can preferentially present information that is important according to a traveling scene.

In addition, in the present embodiment, based on the preceding vehicle information, when a preceding vehicle is present, the 3D drawing unit 73 reduces the scale of the peripheral image Dpm as compared with a case where a preceding vehicle is not present. According to the above, when there is a preceding vehicle, the peripheral image Dpm is an image in which a wide range is viewed from a high place. According to an extension of the range of the information presentation, the peripheral image Dpm can present, to the driver or the like, a situation of the range in front of the preceding vehicle, which is difficult to directly confirm in the actual view, in an easy-to-understand manner.

In the present embodiment, the 3D drawing unit 73 reduces the scale of the peripheral image Dpm in a scene in which the driver's vehicle lane is adjacent to the merging lane based on the type information indicating whether the driver's vehicle lane is adjacent to the merging lane. According to the above, in the merging scene, since the peripheral image Dpm has a mode in which a wide range is viewed from a high position, it is possible to present the state of the other vehicle in the merging lane which is difficult to directly visually recognize to the driver or the like in an easily understandable manner.

Further, the 3D drawing unit 73 of the present embodiment sets the scale of the peripheral image Dpm by giving priority to information having a high priority set in advance among the preceding vehicle information, the vehicle speed information, and the type information. According to the above, the peripheral image Dpm can present a situation around the host vehicle to the driver at a scale suitable for a traveling scene.

In addition, in the present embodiment, the scale of the peripheral image Dpm in a mode of overlooking the host vehicle A is changed according to the presence or absence of the surroundings monitoring obligation in the automated driving being executed. Therefore, even when the information recognized by the sensor for the automated driving increases, the range around the host vehicle reproduced in the peripheral image Dpm can be appropriately adjusted in accordance with an operation state of the automated driving. As a result, the peripheral image Dpm is capable of presenting type of a traveling environment around the host vehicle in an easy-to-understand manner.

In addition, in the present embodiment, when the automated driving with the surroundings monitoring obligation is executed in the host vehicle A, the 3D drawing unit 73 increases the scale of the peripheral image Dpm as compared with a case where the automated driving without the surroundings monitoring obligation is executed in the host vehicle. According to the above, the peripheral image Dpm in which a narrow range is viewed from a low viewpoint is displayed during traveling by the automated driving with the surroundings monitoring obligation. With such the peripheral image Dpm, information on the vicinity of the host vehicle is presented in detail, and thus it is easy to confirm a pedestrian or the like approaching the host vehicle A.

Further, according to the present embodiment, when the host vehicle A is traveling on the sidewalk side lane closest to the sidewalk side based on the self-position information indicating the position where the host vehicle A travels among the plurality of lanes, the 3D drawing unit 73 increases the scale of the peripheral image Dpm. According to the above, since the peripheral image Dpm capable of presenting the information in the vicinity of the host vehicle in detail is displayed, it is easy to confirm a pedestrian or the like on the sidewalk.

In addition, in the present embodiment, the scale of the peripheral image Dpm is changed according to the reliability of recognition by the peripheral monitoring sensor 30. More specifically, when the reliability of the sensor recognition is low, the range around the host vehicle reproduced in the peripheral image Dpm is narrowed. On the other hand, when the reliability of the sensor recognition is high, the range around the host vehicle reproduced in the peripheral image Dpm is widened. As a result, both the reliability of the information presented in the peripheral image Dpm and the simplification of the content can be achieved.

In addition, in the present embodiment, when the abnormal state of the physical condition of the driver is recognized, the scale of the peripheral image Dpm in a mode of overlooking the host vehicle A is increased, and the range around the host vehicle reproduced in the peripheral image Dpm is expanded. Therefore, even in a situation in which it is difficult for the driver to directly check the surroundings of the host vehicle, the peripheral image Dpm can present the traveling environment around the host vehicle in an easy-to-understand manner.

Further, in the present embodiment, when the abnormal state of the physical condition of the driver is grasped, in other words, when the abnormality detection information corresponding to the execution information of the fallback operation is acquired, the number of line icons PIn drawn in the peripheral image Dpm is increased. More specifically, the number of line icons PIn is increased to the maximum number, that is, the number of all lane markings recorded in the map data. According to such the display change, the peripheral image Dpm is capable of presenting a situation of a wide range around the host vehicle without omission at the time of abnormality of the driver.

In addition, according to the present embodiment, the area ratio of the peripheral image Dpm and the route image Drt displayed side by side with the output image Dci is changed based on the host vehicle information. Therefore, the display size of the peripheral image Dpm on the meter display 21 can be appropriately adjusted according to a traveling scene. As a result, the peripheral image Dpm is capable of presenting traveling the environment around the host vehicle in an easy-to-understand manner.

Further, according to the present embodiment, the area ratio of the peripheral image Dpm and the route image Drt displayed side by side with the output image Dci is changed in accordance with the presence or absence of the surroundings monitoring obligation in the automated driving being executed. Therefore, even when information recognized by the sensor for the automated driving increases, the display size of the peripheral image Dpm can be appropriately adjusted according to an operation state of the automated driving. As a result, the peripheral image Dpm is capable of presenting the traveling environment around the host vehicle in an easy-to-understand manner.

Further, according to the present embodiment, when the automated driving without the surroundings monitoring obligation is executed in the host vehicle, the presentation controller 77 increases the area ratio of the peripheral image Dpm as compared with a case where the automated driving with the surroundings monitoring obligation is executed in the host vehicle. According to the above, when the automated driving of the level 3 or higher without the surroundings monitoring obligation is executed, the range of the surroundings of the host vehicle reproduced in the peripheral image Dpm can be expanded. As a result, the driver can collectively grasp information on the surroundings of the host vehicle from the peripheral image Dpm without directly looking at the actual view of the surroundings of the host vehicle. Therefore, convenience of the peripheral image Dpm during the automated driving without the surroundings monitoring obligation is improved.

In the above embodiment, the peripheral monitoring sensor 30 corresponds to a sensor, the dead-man determination block 50 corresponds to a physical condition abnormality grasping unit, the 3D drawing unit 73 and the presentation controller 77 correspond to a display control unit, and the automated driving computer 100 corresponds to a display control device. The line icon PIn corresponds to a line image, the recognition line Li1 corresponds to a recognition image, and the unrecognized line Li2 corresponds to a non-recognition image. Further, the host vehicle icon Pv corresponds to a host vehicle image, the other vehicle icon Po corresponds to a target image, the pedestrian icon Pa corresponds to a warning image, and the route image Drt corresponds to a different image.

Other Embodiments

Although one embodiment of the present disclosure has been described above, the present disclosure is not construed as being limited to the above-described embodiments, and can be applied to various embodiments and combinations within a scope that does not depart from the spirit of the present disclosure.

In a first modification of the embodiment described above, functions of a dead-man determination block 50, a driving control block 60, and an HMI control block 70 are mounted in individual in-vehicle ECUs. In the first modification, a dead-man determination ECU that realizes the function of the dead-man determination block 50, an automated driving ECU that realizes the function of the driving control block 60, and an HMI-ECU that realizes the function of the HMI control block 70 are connected to an in-vehicle network.

The function of the dead-man determination block 50 may be mounted on the automated driving ECU or the HMI-ECU. In a mode in which the function of the dead-man determination block 50 is mounted on an in-vehicle ECU different from the HMI-ECU, an information acquisition unit 71 of the HMI-ECU corresponds to an abnormality grasping unit.

Further, a driving assistance ECU that realizes a driving assistance function of a level 2 or lower may be provided separately from the automated driving ECU that realizes an autonomous traveling function of the automatic driving level 3 or higher. In addition, the driving control block 60 or the automated driving ECU may be capable of executing autonomous traveling control of the automatic driving level 4 or higher. In the autonomous traveling control of the automatic driving level 4, for example, sleep is permitted as a second task.

The dead-man determination block 50 of the above embodiment determines the abnormal state of the driver based on the face image of the driver captured by the driver monitoring unit 38. However, the dead-man determination block 50 may be capable of determining the physical condition abnormality of the driver based on driver information other than the face image. For example, the dead-man determination block 50 may use steering grip information indicating whether the steering wheel is gripped, steering operation information indicating whether the steering operation is performed, and the like to grasp the abnormal state. Further, the dead-man determination block 50 may use vital data received from a wearable terminal worn by the driver, specifically, information such as pulse, blood pressure, and body temperature, to grasp the abnormal state.

In a second modification of the above embodiment, the function of changing the number of line icons PIn is omitted, while the function of changing the scale of the peripheral image Dpm is implemented. On the other hand, in a third modification of the above embodiment, the function of changing the scale of the peripheral image Dpm is omitted, while the function of changing the number of line icons PIn is implemented.

In a fourth modification of the above embodiment, in a case where the presence or absence of a surroundings monitoring obligation is changed, the mode change of a peripheral image Dpm is started after a predetermined time in which control of automated driving is switched. In a fifth modification of the above embodiment, a virtual viewpoint position of a peripheral image Dpm also moves in a left-right direction of a host vehicle icon Pv.

In the peripheral image Dpm of the above embodiment, each lane is reproduced by being separated by the pair of line icons PIn. On the other hand, in the modification of the above embodiment, a plurality of line image portions having a shape extending in a band shape along a up-down direction of a screen reproduces a driver's vehicle lane, an adjacent lane, and the like in a peripheral image Dpm. The host vehicle icon Pv and the other vehicle icon Po are drawn over each line image. As in the sixth modification described above, the drawing shape of the line image for reproducing each lane in the peripheral image Dpm may be appropriately changed.

In the above embodiment, when the abnormal state of the driver is determined to be the driving difficulty state, the display change for changing the scale of the peripheral image Dpm is started. However, the timing of starting the display change based on the abnormal state of the driver may be appropriately changed. As an example, in a seventh modification of the above embodiment, a scale of a peripheral image Dpm is changed at a timing when a posture collapse of a driver is detected, before determination of a driving difficulty state. In an eighth modification of the above embodiment, a scale of a peripheral image Dpm is changed based on a start of traveling by emergency evacuation control.

Furthermore, the fallback operation in which the scale of the peripheral image Dpm is changed is not limited to the emergency evacuation control when the driver is in the driving difficulty state. The fallback operation is control for continuing the automated driving without depending on the control of the driver even if a regulation is temporarily ignored. As an example, even when the fallback operation for avoiding an obstacle in front of the host vehicle by an automatic steering control is performed, the display control for largely changing the scale of the peripheral image Dpm may be performed.

The display devices that displays the peripheral image Dpm is not limited to the meter display 21. The peripheral image Dpm may be displayed on the display screen of the CID 22 or may be displayed as a virtual image by the HUD 23.

In the eighth modification of the above embodiment, another image different from a route image Drt is displayed on an output image Dci together with the peripheral image Dpm. The other image may be, for example, status information of the host vehicle or the like, or may be fuel consumption data, electricity consumption data, or the like of the host vehicle. Further, a target image for notifying a target different from other vehicles, for example, a traffic sign, a road surface marking, or the like may be displayed in the peripheral image. In addition, a warning image that alerts or warns a warning target different from a pedestrian, for example, a cyclist, a fallen object, or the like may be displayed in the peripheral image.

In the above embodiments and modifications, the respective functions provided by the automated driving computer can be also provided by software and hardware for executing the software, only software, only hardware, and complex combinations of software and hardware. In cases where functions are provided by electronic circuits as hardware, the functions can be also provided by analog circuits or digital circuits which include a large number of logic circuits.

Each of the processing units may be individually mounted on a printed circuit board, or may be mounted on an ASIC (Application Specific Integrated Circuit), a FPGA, or the like. The storage medium (non-transitory tangible computer-readable storage medium or non-transitory tangible storage medium) that stores the program for implementing the above-described display control method may be changed as appropriate. For example, the storage medium is not limited to the configuration provided on the circuit board, and may be provided in the form of a memory card or the like. The storage medium may be inserted into a slot portion, and electrically connected to the control circuit of the automated driving computer. The storage medium may be also constituted by an optical disk which forms a source of programs to be copied into an automated driving computer, a hard disk drive therefor, and the like.

The vehicle equipped with the HMI system is not limited to a general private car, but may be a rented vehicle, a vehicle for man-driving taxi, a vehicle for sharing vehicle service, a freight vehicle, a bus, or the like. Furthermore, a driverless vehicle used for a mobility service may be equipped with a system including an automated driving computer.

The vehicle equipped with the automated driving computer may be a right-hand drive vehicle or a left-hand drive vehicle. Further, the traffic environment in which the vehicle travels may be a traffic environment premised on left-hand traffic, or may be a traffic environment premised on right-hand traffic. According to the present disclosure, the display of each content is appropriately optimized according to the road traffic law of each country and region, the steering wheel position of the vehicle, and the like.

The control unit and the method thereof which have been described in the present disclosure may be also implemented by a special purpose computer which includes a processor programmed to execute one or more functions implemented by computer programs. Alternatively, the control unit and the control method described in the present disclosure may be implemented by a special purpose hardware logic circuit. Alternatively, the control unit and the control method described in the present disclosure may be implemented by one or more special purpose computers configured by a combination of a processor executing a computer program and one or more hardware logic circuits. The computer program may be stored, as instructions to be executed by a computer, in a tangible non-transitory computer-readable medium.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A display control device for controlling display of a peripheral image indicating a traveling environment of a host vehicle based on information acquired by a sensor configured to recognize the traveling environment, the display control device comprising:
an information acquisition unit configured to acquire at least type information indicating a type of a road and shape information indicating a lane shape of the road as road information related to the road around the host vehicle, and
a display control unit configured to draw line images reproducing the road in the peripheral image based on the shape information, wherein
the display control unit is configured to, based on the type of information, reduce a number of the line images drawn in the peripheral image to be less than a total number of lane markings of map data included in the shape information.

2. The display control device according to claim 1, wherein
the information acquisition unit is configured to acquire the type information indicating a travel direction of each lane of the road, and
the display control unit is configured to stop drawing of the line images indicating lanes in which the travel direction is different from the travel direction of the host vehicle when a number of lanes of the road exceeds a predetermined number.

3. The display control device according to claim 1, wherein
the information acquisition unit is configured to acquire the type information indicating whether the road is a general road or an expressway, and
the display control unit is configured to reduce the number of the line image drawn in the peripheral image in a case where a traveling road of the vehicle is the expressway as compared with a case where the traveling road is the general road.

4. The display control device according to claim 3, wherein
the display control unit is configured to
draw the line image indicating a road edge of the road in the peripheral image when the traveling road is the general road, and
stop drawing the line image indicating the road edge when the traveling road is the expressway.

5. The display control device according to claim 1, wherein
the information acquisition unit is configured to further acquire automated driving information indicating presence or absence of a surroundings monitoring obligation in the automated driving executed in the host vehicle, and
the display control unit is configured to change the number of the line images drawn in the peripheral image in accordance with the presence or absence of the surroundings monitoring obligation in the automated driving being executed.

6. The display control device according to claim 5, wherein
the display control unit is configured to reduce the number of the line images drawn in the peripheral image in a case where the automated driving with the surroundings monitoring obligation is executed in the host vehicle compared to a case where the automated driving without the surroundings monitoring obligation is executed in the host vehicle.

7. The display control device according to claim 5, wherein
the display control unit is configured to complete a change of the number of the line images drawn in the peripheral image before the presence or absence of the surroundings monitoring obligation in the automated driving is changed.

8. The display control device according to claim 1, wherein,
the display control unit is configured to
further draw a host vehicle image indicating the host vehicle in a driver's vehicle lane reproduced in the peripheral image by the line images, and
enlarge a periphery of the host vehicle image in the peripheral image when the number of the line images drawn in the peripheral image is reduced.

9. The display control device according to claim 1, wherein,
the information acquisition unit is configured to further acquire target detection information indicating a target detected around the host vehicle,
the display control unit is configured to
further draw target images each indicating the target in the peripheral image using the target detection information, and
keep a number of the target images in the peripheral image even when the number of the line image drawn in the peripheral image is reduced.

10. The display control device according to claim 1, wherein,
the information acquisition unit is configured to further acquire warning target information indicating a warning target detected around the host vehicle,
the display control unit is configured to
further draw a warning image indicating the warning target in the peripheral image using the warning target information, and
increase the number of the line images drawn in the peripheral image when the warning image is drawn.

11. The display control device according to claim 1, wherein
the information acquisition unit is configured to acquire at least the type information indicating whether a driver's vehicle lane is adjacent to a merging lane, and
the display control unit is configured to set a scale of the peripheral image to be smaller in a scene in which the driver's vehicle lane is adjacent to the merging lane than in a scene in which the driver's vehicle lane is not adjacent to the merging lane, based on the type information.

12. The display control device according to claim 1, wherein,
the display control unit is configured to stop changing the number of the line images when the display control unit predicts that an increase or decrease in the number of the line images drawn in the peripheral image is repeated.

13. The display control device according to claim 1, wherein,
the display control unit is configured to draw in different modes a recognized image corresponding to a lane marking recognized by the sensor and a non-recognized image corresponding to a lane marking not recognized by the sensor in the line images drawn in the peripheral image.

14. A display control device for controlling display of a peripheral image indicating a traveling environment of a host vehicle based on information acquired by a sensor configured to recognize the traveling environment, the display control device comprising:
- an information acquisition unit configured to acquire, as host vehicle information related to the host vehicle, at least one of preceding vehicle information indicating presence or absence of a preceding vehicle, vehicle speed information indicating a traveling speed of the host vehicle, and type information indicating a type of a road around the host vehicle, and
- a display control unit configured to draw the peripheral image in a mode of an overhead view of the host vehicle and change a scale of the peripheral image based on the host vehicle information.

15. The display control device according to claim 14, wherein,
- the information acquisition unit is configured to acquire at least the vehicle speed information, and
- the display control unit is configured to set a scale of the peripheral image to be larger when the host vehicle is stopped or when the traveling speed is less than a predetermined low speed threshold than when the traveling speed exceeds the low speed threshold, based on the vehicle speed information.

16. The display control device according to claim 14, wherein,
- the information acquisition unit is configured to acquire at least the preceding vehicle information, and
- the display control unit is configured to reduce a scale of the peripheral image in a case where the preceding vehicle is present as compared with a case where the preceding vehicle is not present, based on the preceding vehicle information.

17. The display control device according to claim 14, wherein,
- the information acquisition unit is configured to further acquire self-position information indicating a driver's vehicle lane where the host vehicle travels among a plurality of lanes, and
- the display control unit is configured to increase the scale of the peripheral image when the host vehicle is traveling on a sidewalk lane near a sidewalk based on the self-position information.

18. The display control device according to claim 14, wherein,
- the display control unit is configured to set a scale of the peripheral image so that information having a high priority set in advance among the preceding vehicle information, the vehicle speed information, and the type information is displayed first.

19. The display control device according to claim 14, wherein
- the information acquisition unit is configured to further acquire automated driving information indicating presence or absence of a surroundings monitoring obligation in the automated driving executed in the host vehicle, and
- the display control unit is configured to change the scale of the peripheral image in accordance with the presence or absence of the surroundings monitoring obligation in the automated driving being executed.

20. The display control device according to claim 19, wherein
- the display control unit is configured to increase the scale of the peripheral image in a case where the automated driving with the surroundings monitoring obligation is executed in the host vehicle compared to a case where the automated driving without the surroundings monitoring obligation is executed in the host vehicle.

21. The display control device according to claim 14, wherein,
- the information acquisition unit is configured to further acquire reliability information indicating reliability of recognition by the sensor, and
- the display control unit is configured to change the scale of the peripheral image in accordance with the reliability based on the reliability information.

22. A display control device for controlling display of a peripheral image indicating a traveling environment of a host vehicle based on information acquired by a sensor configured to recognize the traveling environment, the display control device comprising:
- an abnormality grasping unit configured to grasp an abnormal state of a physical condition occurring in a driver of the host vehicle, and
- a display control unit configured to draw the peripheral image in a state of an overhead view of the host vehicle and increase a scale of the peripheral image when the abnormal state of the physical condition of the driver is recognized.

23. The display control device according to claim 22, wherein
- the display control unit is configured to
    - draw line images for reproducing a road around the host vehicle in the peripheral image, and
    - increase a number of the line images drawn in the peripheral image when the abnormal state of the physical condition of the driver is recognized.

24. The display control device according to claim 22 further includes an information acquisition unit configured to acquire execution information of a fallback operation executed in the host vehicle, wherein
- the display control unit is configured to
    - draw line images for reproducing a road around the host vehicle in the peripheral image, and
    - increase a number of the line images drawn in the peripheral image when the execution information of the fallback operation is acquired.

25. A display control device for controlling display of a peripheral image indicating a traveling environment of a host vehicle based on information acquired by a sensor configured to recognize the traveling environment, the display control device comprising:
- an information acquisition unit configured to acquire, as host vehicle information related to the host vehicle, at least one of vehicle speed information indicating a traveling speed of the host vehicle and type information indicating a type of a road around the host vehicle, and
- a display control unit configured to
    - draw the peripheral image in a mode of an overhead view of the host vehicle, acquire a different image aligned with the peripheral image, and
    - change an area ratio between the peripheral image and the different image on display, based on the host vehicle information.

26. The display control device according to claim 25, wherein
- the information acquisition unit is configured to further acquire automated driving information indicating presence or absence of a surroundings monitoring obligation in the automated driving executed in the host vehicle, and the display control unit is configured to change the area ratio between the peripheral image and the different image in accordance with the presence or absence of the surroundings monitoring obligation in the automated driving being executed.

27. A display control device for controlling display of a peripheral image indicating a traveling environment of a host vehicle based on information acquired by a sensor configured to recognize the traveling environment, the display control device comprising:
an information acquisition unit configured to acquire automated driving information indicating presence or absence of a surroundings monitoring obligation in the automated driving executed in the host vehicle, and
a display control unit configured to
draw the peripheral image in a mode of an overhead view of the host vehicle, acquire a different image aligned with the peripheral image, and
change an area ratio between the peripheral image and the different image on display in accordance with the presence or absence of the surroundings monitoring obligation in the automated driving being executed.

28. The display control device according to claim 27, wherein
the display control unit is configured to increase the area ratio of the peripheral image in a case where the automated driving without the surroundings monitoring obligation is executed in the host vehicle, as compared with a case where the automated driving with the surroundings monitoring obligation is executed in the host vehicle.

29. A display control device for controlling display of a peripheral image indicating a traveling environment of a host vehicle based on information acquired by a sensor configured to recognize the traveling environment, the display control device comprising:
an information acquisition unit configured to acquire vehicle speed information indicating a traveling speed of the host vehicle, and
a display control unit configured to
draw the peripheral image in a mode of an overhead view of the host vehicle and change a scale of the peripheral image based on the vehicle speed information,
increase the scale of the peripheral image when the host vehicle is stopped, compared to before the vehicle was stopped, based on the vehicle speed information.

30. A display control device for controlling display of a peripheral image indicating a traveling environment of a host vehicle based on information acquired by a sensor configured to recognize the traveling environment, the display control device comprising:
an information acquisition unit configured to acquire shape information indicating a lane shape of a road around the host vehicle and automated driving information indicating presence or absence of a surroundings monitoring obligation in the automated driving executed in the host vehicle, and
a display control unit configured to draw line images reproducing the road in the peripheral image based on the shape information, wherein
the display control unit is configured to change a number of the line images drawn in the peripheral image in accordance with the presence or absence of the surroundings monitoring obligation in the automated driving being executed.

31. A display control device for controlling display of a peripheral image indicating a traveling environment of a host vehicle based on information acquired by a sensor configured to recognize the traveling environment, the display control device comprising:
an information acquisition unit configured to acquire shape information indicating a lane shape of a road around the host vehicle and recognition information of other vehicles traveling around the host vehicle, and
a display control unit configured to draw line images reproducing the road in the peripheral image based on the shape information, wherein
the display control unit is configured to change a number of the line images drawn in the peripheral image according to a number of the other vehicles traveling around the host vehicle based on the recognition information.

32. The display control device according to claim 31, wherein
the display control unit is configured to increase the number of the line images drawn in the peripheral image as the number of the other vehicles traveling around the host vehicle increases.

33. A display control device for controlling display of a peripheral image indicating a traveling environment of a host vehicle based on information acquired by a sensor configured to recognize the traveling environment, the display control device comprising:
an information acquisition unit configured to acquire automated driving information indicating presence or absence of a surroundings monitoring obligation in the automated driving executed in the host vehicle, and
a display control unit configured to draw the peripheral image in a mode of an overhead view of the host vehicle and change a scale of the peripheral image in accordance with the presence or absence of the surroundings monitoring obligation in the automated driving being executed.

* * * * *